(12) United States Patent
Sakezles et al.

(10) Patent No.: US 12,462,709 B2
(45) Date of Patent: Nov. 4, 2025

(54) ARTIFICIAL CANINE MODEL

(71) Applicant: SYNDAVER LABS, INC., Tampa, FL (US)

(72) Inventors: Christopher Sakezles, Tampa, FL (US); David Danielson, Tampa, FL (US)

(73) Assignee: SYNDAVER LABS, INC., Tampa, FL (US)

( * ) Notice: Subject to any disclaimer, the term of this patent is extended or adjusted under 35 U.S.C. 154(b) by 547 days.

(21) Appl. No.: 17/888,210

(22) Filed: Aug. 15, 2022

(65) Prior Publication Data

US 2022/0392375 A1 Dec. 8, 2022

Related U.S. Application Data

(63) Continuation-in-part of application No. 16/701,076, filed on Dec. 2, 2019, now Pat. No. 11,417,241.

(60) Provisional application No. 62/774,235, filed on Dec. 1, 2018.

(51) Int. Cl.
*G09B 23/28* (2006.01)

(52) U.S. Cl.
CPC .................. *G09B 23/288* (2013.01)

(58) Field of Classification Search
CPC ...... G09B 23/28; G09B 23/30; G09B 23/303; G09B 23/32; G09B 23/34
See application file for complete search history.

(56) References Cited

U.S. PATENT DOCUMENTS

| | | |
|---|---|---|
| 2,995,833 A | 8/1961 | Bezark |
| 3,802,096 A | 4/1974 | Matern |
| 4,351,822 A | 9/1982 | Allen |
| 4,433,961 A | 2/1984 | Chandler |
| 4,455,318 A | 6/1984 | Maurice et al. |
| 4,455,334 A | 6/1984 | Ogino et al. |
| 4,646,334 A | 2/1987 | Zerhouni |
| 4,734,039 A | 3/1988 | Thompson |
| 4,773,865 A | 9/1988 | Baldwin |
| 4,850,877 A | 7/1989 | Mason et al. |
| 4,867,686 A | 9/1989 | Goldstein |
| 5,320,537 A | 6/1994 | Watson |
| 5,680,590 A | 10/1997 | Parti |
| 5,908,302 A | 6/1999 | Goldfarb |
| 5,945,056 A | 8/1999 | Day et al. |
| 5,947,744 A | 9/1999 | Izzat |
| 6,030,379 A | 2/2000 | Panescu et al. |
| 6,056,745 A | 5/2000 | Panescu et al. |
| 6,062,866 A | 5/2000 | Prom |
| 6,132,463 A | 10/2000 | Lee et al. |
| 6,205,871 B1 | 3/2001 | Saloner et al. |
| 6,206,703 B1 | 3/2001 | O'Bannon |
| 6,234,804 B1 | 5/2001 | Yong |
| 6,361,729 B1 | 3/2002 | Strover et al. |
| 6,474,993 B1 | 11/2002 | Grund |

(Continued)

*Primary Examiner* — Kurt Fernstrom
(74) *Attorney, Agent, or Firm* — Timothy H. Van Dyke; Wolter Van Dyke Davis, PLLC

(57) ABSTRACT

Disclosed herein are anatomic models that comprise components that simulate canine components. The models may be used for development, experimentation, or training in the field of orthopedic surgical devices, and/or implant devices. The models may also be used for training of students in the veterinarian field for procedures performed in practice.

16 Claims, 32 Drawing Sheets

(56) References Cited

U.S. PATENT DOCUMENTS

| | | |
|---|---|---|
| 6,488,507 B1 | 12/2002 | Stoloff et al. |
| 6,511,325 B1 | 1/2003 | Lalka et al. |
| 6,589,057 B1 | 7/2003 | Keenan et al. |
| 6,695,619 B2 | 2/2004 | Browne-Wilkinson |
| 6,773,263 B2 | 8/2004 | Nicholls et al. |
| 6,780,016 B1 | 8/2004 | Toly |
| 6,887,082 B2 | 5/2005 | Shun |
| 6,939,138 B2 | 9/2005 | Chosack et al. |
| 6,997,719 B2 | 2/2006 | Wellman et al. |
| 7,008,232 B2 | 3/2006 | Brassel |
| 7,191,110 B1 | 3/2007 | Charbel et al. |
| 7,255,565 B2 | 8/2007 | Keegan |
| 7,272,766 B2 | 9/2007 | Sakezles |
| 7,347,695 B2 | 3/2008 | Ware |
| 7,384,268 B2 | 6/2008 | Browne-Wilkinson |
| 7,427,199 B2 | 9/2008 | Sakezles |
| 7,507,092 B2 | 3/2009 | Sakezles |
| 7,549,866 B2 | 6/2009 | Cohen et al. |
| 7,699,615 B2 | 4/2010 | Sakezles |
| 7,887,330 B2 | 2/2011 | King |
| 7,993,140 B2 | 8/2011 | Sakezles |
| 8,137,110 B2 | 3/2012 | Sakezles |
| 8,221,129 B2 | 7/2012 | Parry |
| 8,425,234 B2 | 4/2013 | Sakezles |
| 8,425,235 B2 | 4/2013 | Sakezles |
| 8,512,044 B2 | 8/2013 | Sakezles |
| 8,535,062 B2 | 9/2013 | Nguyen |
| 8,613,621 B2 | 12/2013 | Hendrickson |
| 8,801,438 B2 | 8/2014 | Sakezles |
| 8,840,403 B2 | 9/2014 | Segall |
| 8,944,825 B2 | 2/2015 | Reid-Searl |
| 9,472,122 B2 | 10/2016 | Sakezles |
| 9,548,002 B2 | 1/2017 | Black |
| 9,589,483 B2 | 3/2017 | Buckman |
| 9,679,501 B2 | 6/2017 | Sakezles |
| 9,881,522 B2 | 1/2018 | Sakezles et al. |
| 9,940,849 B2 | 4/2018 | Hart |
| 10,354,559 B2 | 7/2019 | Sakezles |
| 10,424,226 B2 | 9/2019 | Sakezles et al. |
| 10,553,131 B2 | 2/2020 | Sakezles |
| 2002/0098467 A1 | 7/2002 | Dente |
| 2003/0031993 A1* | 2/2003 | Pugh ................... G09B 23/34 434/262 |
| 2003/0044395 A1 | 3/2003 | Morgan et al. |
| 2003/0044758 A1 | 3/2003 | Ray |
| 2003/0198925 A1 | 10/2003 | Dowell |
| 2004/0009459 A1 | 1/2004 | Anderson et al. |
| 2004/0118224 A1 | 6/2004 | Tate et al. |
| 2004/0126746 A1 | 7/2004 | Toly |
| 2004/0234933 A1 | 11/2004 | Dawson et al. |
| 2005/0100873 A1 | 5/2005 | Meythaler et al. |
| 2005/0106545 A1 | 5/2005 | Heruth et al. |
| 2006/0051729 A1 | 3/2006 | Zeeff |
| 2006/0269906 A1 | 11/2006 | White |
| 2007/0148626 A1 | 6/2007 | Ikeda |
| 2007/0292829 A1 | 12/2007 | King |
| 2008/0076099 A1 | 3/2008 | Sarvazyan et al. |
| 2008/0227073 A1 | 9/2008 | Bardsley |
| 2010/0062407 A1 | 3/2010 | Lecat |
| 2011/0269109 A2 | 11/2011 | Miyazaki |
| 2011/0287398 A1 | 11/2011 | Blackburn |
| 2012/0003621 A1* | 1/2012 | Segall ................... G09B 23/32 434/272 |
| 2012/0015337 A1 | 1/2012 | Hendrickson |
| 2012/0034587 A1* | 2/2012 | Toly ..................... G09B 23/30 434/267 |
| 2012/0202180 A1 | 8/2012 | Stock |
| 2012/0282584 A1 | 11/2012 | Milton |
| 2012/0288839 A1 | 11/2012 | Crabtree |
| 2013/0078603 A1 | 3/2013 | Yang |
| 2013/0101973 A1 | 4/2013 | Hoke et al. |
| 2013/0109000 A1 | 5/2013 | Nelson |
| 2013/0177890 A1* | 7/2013 | Sakezles ................ G09B 23/30 434/274 |
| 2014/0017650 A1 | 1/2014 | Romero |
| 2014/0030682 A1* | 1/2014 | Thilenius ............... G09B 23/30 434/219 |
| 2014/0051050 A1 | 2/2014 | Fradette |
| 2014/0154656 A1 | 6/2014 | Segall |
| 2014/0255967 A1 | 9/2014 | Dancu |
| 2014/0272880 A1* | 9/2014 | Buckman ............. G09B 23/288 434/272 |
| 2014/0329217 A1 | 11/2014 | Barsness |
| 2015/0161347 A1 | 6/2015 | Christiansen |
| 2016/0355676 A1 | 12/2016 | Felsinger et al. |
| 2017/0022348 A1 | 1/2017 | Iwata et al. |
| 2017/0046985 A1 | 2/2017 | Hendrickson et al. |
| 2017/0186340 A1 | 6/2017 | Ogawa et al. |
| 2017/0301264 A1 | 10/2017 | Vara et al. |
| 2018/0061279 A1 | 3/2018 | Nimi et al. |
| 2018/0144662 A1* | 5/2018 | Tassone ............... G09B 23/306 |
| 2019/0236986 A1* | 8/2019 | Velasco ................. G09B 9/00 |
| 2019/0300628 A1 | 10/2019 | Saito et al. |
| 2021/0209968 A1* | 7/2021 | Namima ............. G09B 23/303 |
| 2021/0272479 A1* | 9/2021 | Yamanaka ............ G09B 23/32 |

* cited by examiner

ARTIFICIAL CANINE MODEL

BACKGROUND

During the training of any veterinary practitioner or student, hands-on surgical training is essential. The standard for such training has been the use of animal cadavers or live animals, which are expensive and difficult to obtain. Also, the risks associated with the use of cadavers including risks relating to the exposure to biohazards, for example, formaldehyde presents a disadvantage of using cadavers for training purposes. Furthermore, cadaver models provide a fairly accurate representation of size and geometry, but the mechanical properties of the target anatomy are altered by death of the subject and by the required tissue preservation techniques. It is therefore impossible to use these models at normal body temperature or in the presence of fluids.

Live animals are also often used for training purposes in the scientific and medical fields; however animal models suffer from a whole range of unique problems, including the many deviations between animal anatomy and physiology, the confounding effects of variation between individual animals, and the unpredictability that arises from using a model that is extraordinarily complex.

Animal models may include live canine, cat, porcine, or bovine specimens, among others. The specialized facilities required to house the animals and the expenses associated there with limit their in-house use. Reproducibility may also be an issue as both inter- and intrasubject variability are difficult to control. Additional considerations include contention with the Animal Welfare Act, the significant expense associated with contracting regulated facilities and medical practitioners, and the risks related to handling biohazardous materials.

Canine anatomical models have been proposed using elastomeric compositions for tissue. However, there has not been a model training device that includes the necessary level of detail and similarity to a live canine body, including the finer aspects of canine tissue, and the functionality of systems of the human body necessary for effective training. Difficulty has been found in the prior art in replicating canine tissue at a level at which the final product bears sufficient similarity and functions in a way that is nearly parallel to that of the live canine.

SUMMARY

The need for a system that allows veterinary surgeons and students to perform trial surgical and other medical procedures on an anatomic model of a canine bearing a sufficient similarity to actual animal anatomy has been realized herein. This system would enable a veterinarian or student to optimize instrumentation and surgical approaches for that particular procedure without putting a patient at risk. One aspect of the subject invention provides an anatomic model of a animal including materials that closely mimic the physical properties of living tissues. The use of this model would enable the surgeon to perform a trial run surgery in an environment that closely resembles the patient's anatomy without any risk to the patient, or the practioner to learn how to perform or to perfect a particular procedure before having to perform it on a patient.

One important feature of certain embodiments of the subject invention is the implementation of synthetic materials that can simulate one or more physical properties of living tissues. These materials are in most cases hydrogel materials that are designed on the basis of physical tests performed on actual living target tissues. For example, a particular analog material might be designed to exhibit a tensile strength close to 10 kPa to mimic a target tissue that exhibits a tensile strength of 10 kPa. One or more components made from these materials are then assembled into a configuration that mimics both the size and geometry of the target anatomic structure.

In certain embodiments, the subject invention pertains to anatomic models that comprise components that simulate canine components. The models may be used for development, experimentation, or training in the field of surgical devices, and/or implant devices. The models may also be used for training of students in the medical or veterinary field for procedures performed in practice, such as for example drawing blood from a patient, or placing a central line in a carotid artery of a patient. In exemplary embodiments, the models comprise structures such as cartilage, tendons, ligaments, organs, luminal structures, and muscles that are made of hydrogel materials. The models provide an effective teaching and training device, due to their similarity to real tissues, organs and organ systems, as well as the simplicity in the replacement of parts or components which are damaged or used during the training. In certain embodiments, the components of the anatomic models (e.g., modules, individual muscles, ligaments, etc.) are replaceable independently of one another, providing a substantial cost-saving feature over current teaching devices in the field which require replacement of an entire teaching model or large sections of a model.

BRIEF DESCRIPTION OF THE DRAWINGS

FIG. 20A shows the stomach component before twisting. FIG. 20B shows the initiation of twisting of the stomach component. FIG. 20C shows the near complete twisting of the stomach component and FIG. 20D shows the complete twisting of stomach component with model ready for training.

FIG. 21A shows the model in center incision made. FIG. 21B shows the opening of the abdomen to access the stomach component. FIG. 21C shows the deflation of the stomach component. FIG. 21D shows the initiation of untwisting the stomach component. FIG. 21F shows the completed untwisting of the stomach component.

DEFINITIONS

Figure 1:
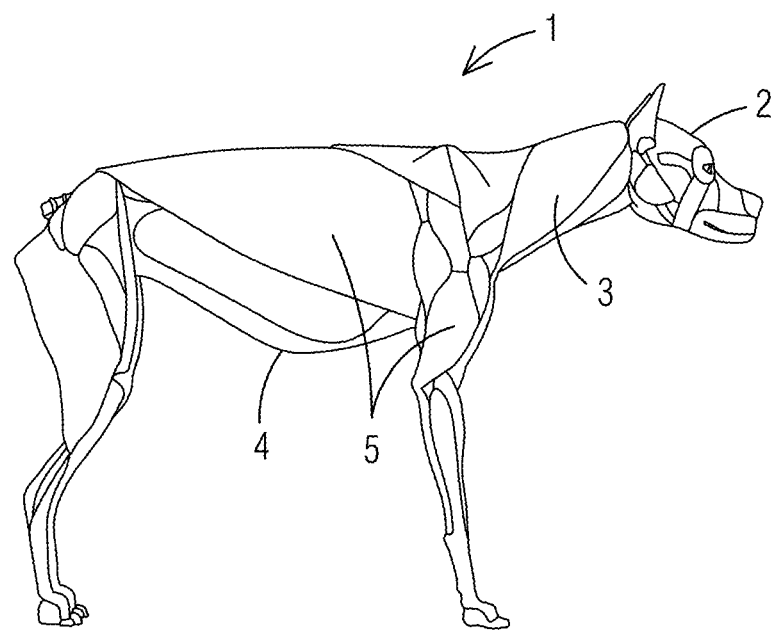
FIG. 1 shows a diagram of a canine skeleton (left) and a canine model with skin removed (right).
Figure 1:
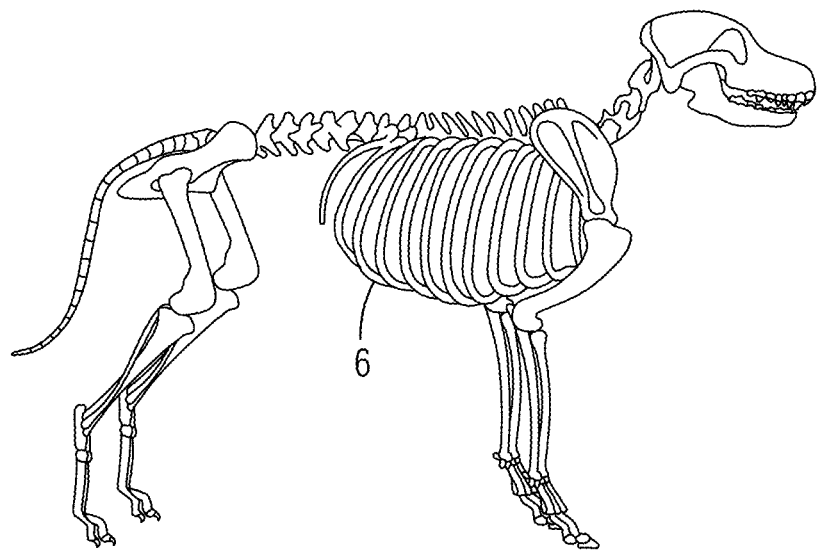

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

The terms "anatomic(al) teaching model", "anatomic(al) model", and "model training device" are used interchangeably, herein.

The term "hydrogel(s)" as used herein refers to a unique class of materials that contain a large amount of water and generally exhibit a high degree of elasticity and lubricity. These materials are ideal for simulating the physical properties of many living soft tissues. Hydrogels are materials that are wetable and swell in the presence of moisture and retain water without dissolving. These materials are generally constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding.

The tissues and structures that "are comprised of, in part or in whole, a hydrogel," aside from hydrogel materials, may include, but are not limited to, hydrophillic polymers, interpenetrating or semi-interpenetrating polymer networks, fibers, silicone rubber, natural rubber, other thermosetting elastomers, other thermoplastic elastomers, acrylic polymers, other plastics, ceramics, cements, wood, styrofoam, metals, actual animal tissues, and any combination thereof. For model embodiments comprising one or more components, each component part may be constructed from one or more tissue analog materials.

The modules, bones, muscular tissues, ligaments, tendons, skin layers, and luminal structures are formulated to simulate one or more physical characteristics of a target living tissue. These physical characteristics include, but are not limited to, uni-axial or multi-axial tensile strength or modulus, uni-axial or multi-axial compressive strength or modulus, shear strength or modulus, coefficient of static or dynamic friction; surface tension; elasticity; wettability; water content; electrical resistance and conductivity; dielectric properties; optical absorption or transmission, thermal conductivity, porosity, moisture vapor transmission rate, chemical absorption or adsorption; or combinations thereof. Each tissue, module, or structure is designed so that one or more of its physical characteristics will sufficiently match the corresponding physical characteristic(s) of the relevant tissue on which the module, bone, muscular tissue, ligament, tendon, skin layer or luminal structure is based. More specifically, each tissue analog material is preferably formulated so that the physical characteristic(s) of the tissue analog fall within a range that is no more than 50% lesser or greater than the targeted physical characteristic(s) of the relevant living tissue on which the tissue analog material is based.

The aforementioned listed physical characteristics are well understood, and may be determined by well-established techniques. References teaching the determination of different physical characteristics (in no way intended to be an exhaustive list) include the following:

(1) Shigley, J. E., and Mischke, C. R. *Mechanical Engineering Design*, 5$^{th}$ Ed., McGraw-Hill, 1989.
(2) Harper, C. A., *Handbook of Materials for Product Design*, 3$^{rd}$ Ed., McGraw-Hill, 2001.
(3) Askeland, D. R., *The Science and Engineering of Materials*, 2$^{nd}$ Ed., PWS-Kent, 1989.
(4) LaPorte, R. J., *Hydrophilic Polymer Coatings for Medical Devices*, Technomic Publishing, 1997
(5) Hayt, W. H., and Kemmerly, J. E., *Engineering Circuit Analysis*, 4$^{th}$ Ed., McGraw-Hill, 1986.
(6) Park, J. B., and Lakes, R. S., *Biomaterials, An Introduction*, 2$^{nd}$ Ed., Plenum Press, 1992.
(7) Lindenburg, M. R., Editor, *Engineer in Training Manual*, 8$^{th}$ Ed., Professional Publications, 1992.

Other references of note that are incorporated herein are Ottensmeyer et al., "The Effects of Testing Environment on the Viscoelastic Properties of Soft Tissues, Proceedings of Medical Simulation," International Symposium—ISMS 2004, Cambridge, MA, Jun. 17-18, 2004 and references cited therein; and Brouwer et al. "Measuring in Vivo Animal Soft Tissue Properties for Haptic Modeling in Surgical Simulation", *Proc. Medicine Meets Virtual Reality*, Newport Beach, CA, IOS Press, 2001, and references cited therein.

Particular teachings of certain physical characteristics are noted (references numbers related to preceding list):

Tensile strength and modulus, both measured in Pascal (Pa)—Ref 1, pg 186.
Compressive strength and modulus, both measured in Pascal (Pa)—Ref 2, pg 718.
Shear strength and modulus, both measured in Pascal (Pa)—ASTM Standard D3165-00, Standard Test Method for Strength Properties of Adhesives in Shear by Tension Loading of Single-Lap-Joint Laminated Assemblies.
Coefficient of static and dynamic friction, a dimensionless number—Ref 7, pg 445.
Surface tension, measured in dynes/cm—Ref 6, pg 57.
Wettability, measured in terms of contact angle (degrees)—Ref 4, pg 3.
Water content, measured in mass percent (%)—Ref 4, pg 41.
Electrical resistance and conductance, measure in ohm for resistance and mho for conductance—Ref 5, pg 25.
Dielectric properties, measured in various units—ASTM Standard E2039-04 Standard Test Method for Determining and Reporting Dynamic Dielectric Properties.
Optical absorption and transmission, measured in $cm^{-1}$—Ref 3, pg 739.
Thermal conductivity, measured in cal/(cm-s-C)—ASTM Standard D5930-01 Standard Test Method for Thermal Conductivity of Plastics by Means of a Transient Line-Source Technique.
Porosity, measured in volume percent (%)—Ref 3, pg 490.
Moisture vapor transmission rate, measured in g/(mil-in$^2$)—Ref 2, pg 941.

The term "artificial" as used herein to describe an anatomic model refers to a model that is either synthetically manufactured or naturally manufactured in vivo and assembled with model components. The anatomic model includes model components such as organ modules, muscular tissue, ligament structures, tendons, bones, and other such structures or "components." In the case of naturally manufactured artificial components, this may refer to actual tissues or anatomical structures procured from a cadaveric human or from a nonhuman subject that are removed from the subject processed and assembled with other artificial components.

The term "geometrically mimic" as used herein refers to a comparative relationship of a configuration of an artificial anatomical model, and/or artificial structural component thereof, with a target anatomical structure wherein such configuration comprises one or more similar geometric features of the target anatomical structure to be mimicked, such as length, width, diameter, thickness, cross-section, and/or, in most cases general shape of a particular target anatomical structure.

The term "canine tissue" as used herein refers to the one or more tissues that constitute a canine anatomical structure. "Anatomic structures" may include tissue types, bone types, organ types, and/or part of organ(s).

As used herein the term "canine anatomical structure" refers to one or more tissue structural components that make up a part of anatomy of a canine. A part of anatomy may include, but is not limited to, whole organs, parts of an organ, or a section of a body comprising one or more tissue types, organ types, and/or part of organ(s).

The term "fluidly connected" means that the connection allows for transport of gas or liquid.

DETAILED DESCRIPTION

There is much interest in the development of anatomic models with components that simulate those of a canine with significant similarity for use in education, training, and practice of students and professionals. More preferably, an anatomic model with easily removable and replaceable anatomic structures is essential to a successful medical learning environment. The model embodiments of the subject invention may serve as a highly sophisticated testing and learning system enabling a surgeon or medical student to optimize instrumentation and surgical approaches for a particular procedure before having to perform the procedure on a live patient.

Accordingly, in one embodiment, an artificial anatomic model configured to geometrically mimic a canine torso is provided. The torso includes one or more bones, the one or more bones geometrically mimic at least a portion of one or more canine bones. The torso also includes a cavity configured to receive at least one module, the cavity and the at least one module is comprised of, in part, or in whole, a hydrogel, and the at least one module geometrically mimics at least a portion of a canine organ. A muscular tissue is also provided as part of the torso, the muscular tissue is comprised of, in part or in whole, a hydrogel. The muscular tissue geometrically mimics at least a portion of a canine muscular tissue and simulates at least one predetermined physical characteristic of muscle tissue with at least fifty percent or more similarity.

The artificial anatomic model further includes one or more tendons, wherein the one or more tendons are comprised of, in part or in whole, a hydrogel, and the one or more tendons geometrically mimic at least a portion of a canine tendon. The at least one or more tendons simulate at least one predetermined physical characteristic of tendon tissue with at least fifty percent or more similarity. The artificial anatomic model also includes one or more ligaments. The one or more ligaments are comprised of, in part or in whole, a hydrogel, and the one or more ligaments geometrically mimic at least a portion of a canine ligament and simulate at least one predetermined physical characteristic of ligament tissue with at least fifty percent or more similarity. At least one luminal structure is provided in the artificial anatomic model, the at least one luminal structure is comprised of, in part or in whole, a hydrogel. The at least one luminal structure geometrically mimics at least a portion of a canine luminal structure and simulates at least one predetermined physical characteristic of a luminal tissue with at least fifty percent or more similarity.

Typical engineering materials, including many metals, ceramics, and plastics commonly employed in industry may be used in creating the anatomic model depending on the required analog properties. However, in cases where soft tissues are being modeled it will generally be advantageous to use nonstandard materials such as hydrogels. These materials swell in the presence of moisture and can retain large amounts of water without dissolving. They are constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding. Hydrogels are particularly advantageous in this application because the formula may be manipulated to give a combination of water content, lubricity, abrasion resistance, and other properties characteristic of living soft tissues. In this respect these materials are particularly suited to modeling fragile tissues such as venous or arterial intima and ciliated epithelia. Hydrogels also provide an ideal substrate for maintaining a surface of live cells if so desired.

The models of the subject disclosure may employ a wide variety of hydrogel materials, including but not limited to polyvinyl alcohol, polyvinyl pyrrolidone, polyethylene oxide, polyhydroxyethyl methacrylate; polyethylene glycol, hyaluronic acid, gelatin, carrageen, alginates, chondroitan sulfate, dermatan sulfate (and other proteoglycans). This entire class of materials is physically more tissue-like simply by nature of incorporating water, but by carefully controlling such parameters as molecular structure, density, wall thickness, durometer, and many other physical properties and characteristics a good match between the actual tissue and analog material may be achieved.

Poly (vinyl alcohol) is normally produced by the acid-catalyzed hydrolysis of poly (vinyl acetate), which effectively converts the pendant acetate groups to hydroxyl groups. The properties of the resulting polymer are determined by tacticity, degree of hydrolysis, and molecular weight. Most commercial grades of PVA are stereoregular (primarily isotactic) with less than 2% of the repeat units forming in the 'head-to-head' (adjacent hydroxyl groups) configuration. In theory this should allow a high degree of crystallinity in the finished product. However, this is hindered by the presence of residual acetate groups so the tendency toward crystallization depends primarily on the degree of hydrolysis. This refers to the percentage of converted acetate groups on the main chain. Partially hydrolyzed grades (less than 75% conversion) do not crystallize significantly and are soluble in water at room temperature. This is because the large number of bulky acetate groups increases free volume and prevents the long-range interchain associations required for crystallization to occur. As the degree of hydrolysis increases the loss of bulky acetate groups reduces free volume and the chains are allowed to more closely approach one another. The compact but highly polar hydroxyl groups then come into close proximity and 'bind' the chains together through strong hydrogen bonding. These interchain forces increase the degree of crystallinity and greatly reduce solubility. In fact, in spite of the high concentration of hydroxyl groups completely hydrolyzed grades of PVA should be heated to nearly 100 C to attain solution. These materials exhibit excellent mechanical properties and chemical resistance and also swell to a significant degree.

The properties of PVA hydrogels vary with molecular weight, but since these materials are normally obtained in polymer form the molecular weight cannot easily be adjusted. Instead these properties are typically modified by means of chemical or physical crosslinking. Chemical gels are easily formed by the addition of agents which undergo condensation with the hydroxyl groups on the main chain. A number of aldehydes (glutaraldehyde, formaldehyde, etc.), dicarboxylic acids (adipic acid, terephthalic acid, etc.), and metal ions ($Fe^{3+}$, $B^{5+}$, etc.) will form chemical bonds with PVA which result in crosslinks. Longer molecules such as diacids are generally preferred over metal ions because the ion 'bridge' is short and restrictive, embrittling the material. Molecules such as adipic acid can effectively restrict chain mobility while maintaining some measure of flexibility.

The orientation of a given gel material may be induced by drawing the material, by heat treatment, or by casting the polymer in solution with a gelling agent. These agents create specific interactions between the hydroxyl groups on adjacent chains, bringing them together to improve hydrogel bonding. Many such agents are known, and this process is easily employed on a laboratory scale.

The models of the subject disclosure are characterized by a similarity of geometry, of individual component physical properties, and of component-to-component interfacial properties with living tissue. On the simplest level, individual model components are fabricated such that they mimic the geometry of a particular target anatomy.

The geometric data needed for fabrication is typically obtained in two ways. The traditional approach is to obtain data from the literature on morphology or from cadaver measurements. While not a bad approximation, this method is time-consuming and permits a large degree of error. A better method would be to obtain the geometric data directly from a patient.

After collecting the appropriate geometric data, the individual model components may be fabricated from appropriate analog materials. Depending on the complexity of the part and the type of materials used, the individual component might be molded, extruded, or machined. The models of the subject disclosure are constructed from multiple components, and these individual components are fabricated in such a way that they mimic the geometry (length, width, diameter, thickness, cross-section, shape, etc) of a particular portion of the target anatomy.

The individual components of the subject disclosure are assembled in such a way that the interaction between adjacent components yields the overall interaction expected in the actual target tissue. That is, the interfacial properties (bond strength, component-to-component friction, etc)

between the various model components are designed to simulate the interaction between the relevant tissues in the target anatomy.

The anatomic model of claim 1, wherein the at least one predetermined physical characteristic of muscle tissue, tendon tissue and/or ligament tissue comprises at least one of the following: color, tensile modulus, shear strength, puncture resistance, compressive modulus, dielectric constant, electrical conductivity, and/or thermal conductivity.

The anatomic model is provided in an embodiment wherein the at least one predetermined physical characteristic of luminal tissue comprises at least one of the following: coefficient of friction and abrasion resistance.

The anatomic model is provided in an embodiment wherein said organ is a diseased organ and/or wherein said muscular tissue is a diseased muscular tissue. In another embodiment, the anatomic model is provided wherein the at least one luminal structure is diseased.

In another embodiment, the anatomic model is further provided wherein the organ is a visceral organ. In a further embodiment, the visceral organ comprises at least one of kidneys, liver, gallbladder, pancreas and spleen.

The anatomic model is provided in another embodiment wherein the organ is a sensory organ.

In a further embodiment, at least one luminal structure of the anatomic model is removably attachable to an organ, a muscle, a tendon, a ligament, or another luminal structure. In a more particular embodiment, the muscular tissue is removably attachable to the one or more bones by a composite pin. The anatomic model is provided in another embodiment wherein the muscular tissue, the one or more tendons, the one or more ligaments, the one or more bones, and/or the at least one luminal structure are attachable to one another and/or to the cavity by an attachment mechanism comprising suture, Velcro, pins, composite pins, hook, and/or glue.

The anatomic model is provided in another embodiment, wherein the cavity is an abdominal cavity, and the abdominal cavity is sealed such that it is capable of insufflation.

In one embodiment, the luminal structure comprises an attaching end, wherein the attaching end comprises an attachment piece. The attachment piece comprises a narrow collared portion and a flanged portion, wherein the narrow collared portion fits over the attaching end of the luminal structure, and wherein the luminal structure is folded around the outside of the flanged portion of the attachment piece.

The anatomic model is provided in a further embodiment, wherein the at least one luminal structure is removably attachable to another of the at least one luminal structures, wherein the attaching ends of each luminal structure are joined together such that there is an uninterrupted communication between the at least one luminal structure and the other of the at least one luminal structures, providing a passageway between the luminal structures.

In one embodiment the anatomic model is provided wherein the muscular tissue comprises multiple individual muscles. In another embodiment, the multiple individual muscles are independently replaceable of one another. In another embodiment, the anatomic model is provided wherein the module are independently replaceable of one another.

In a further embodiment, the anatomic model is provided wherein the at least one luminal structure is independently replaceable. In another embodiment, the one or more bones are independently replaceable of one another. In yet another embodiment, the one or more tendons are independently replaceable of one another. In still another embodiment, the one or more ligaments are independently replaceable of one another.

In another embodiment, the anatomic model is provided further comprising a skin layer, wherein the skin layer covers over at least a portion of the torso. In a further embodiment the skin layer includes an epidermis, a dermis, and a subcutaneous tissue layer. In yet a further embodiment, the epidermis, dermis, and subcutaneous tissue layers are independently removable and replaceable of one another. In a particular embodiment, the subcutaneous tissue layer is affixed to the dermis layer by a suture line, Velcro, a zipper, or other similar form of attachment.

In another embodiment, the anatomic model of the subject disclosure is provided wherein the modules are attached to the one or more bones, other modules, or to the cavity with fascia sacs, wherein the fascia sacs mimic a canine fascia tissue with fifty percent or more similarity.

In yet another embodiment, the anatomic model is provided wherein the at least one luminal structure comprises a tubular structure. In a further embodiment, the tubular structure is an artery, a vein, or a capillary.

In another embodiment, an artificial anatomic model system including the artificial anatomic model is provided. The anatomic model system includes a respiratory system, said respiratory system mimicking at least a portion of a canine respiratory system, wherein the respiratory system includes a trachea, lungs, and a diaphragm, and the respiratory system mimics at least a portion of the functions of a canine respiratory system.

In another embodiment, an artificial anatomic model system is provided including the artificial anatomic model. The model system further including a digestive system, wherein the digestive system mimics at least a portion of a canine digestive system, between an esophagus and a rectum, and wherein the digestive system mimics at least a portion of the functions of a canine digestive system.

In another embodiment, an artificial anatomic model system is provided including the artificial anatomic model. The model system further including a circulatory system, wherein the circulatory system mimics at least a portion of a canine circulatory system, and wherein the circulatory system mimics at least a portion of the functions of a canine circulatory system. In a further embodiment of the artificial anatomic model system, the circulatory system comprises a heart, at least one coronary artery, an aorta, a vena cava, and at least one primary arterial and venous trunk. In still a further embodiment, synthetic blood is pumped through the anatomic model, such that the flow of blood mimics at least a portion of the flow of blood of a canine circulatory system.

As background support, U.S. Pat. No. 8,801,438 is cited and incorporated herein in its entirety. The '438 patent relates to a human anatomical model.

Descriptions of the Illustrative Embodiments

Depicted in the drawings are a number of anatomical models with features that simulate a certain pathology and/or include features that make them particularly suitable for certain surgical procedures.

FIG. 1 shows a general anatomical diagram side view (right) of a full canine artificial model 1. The model 1, includes a head portion 2, neck portion 3, thoracic portion 4 and muscle tissue 5 layered over a canine skeleton 6 (left). As discussed above, various tissue components are implemented such as simulated muscle tissue, simulated connective tissue, simulated skin, etc. As is explained herein, the disclosed canine anatomical models may be comprised of a portion of a canine full anatomy.

Figure 2:
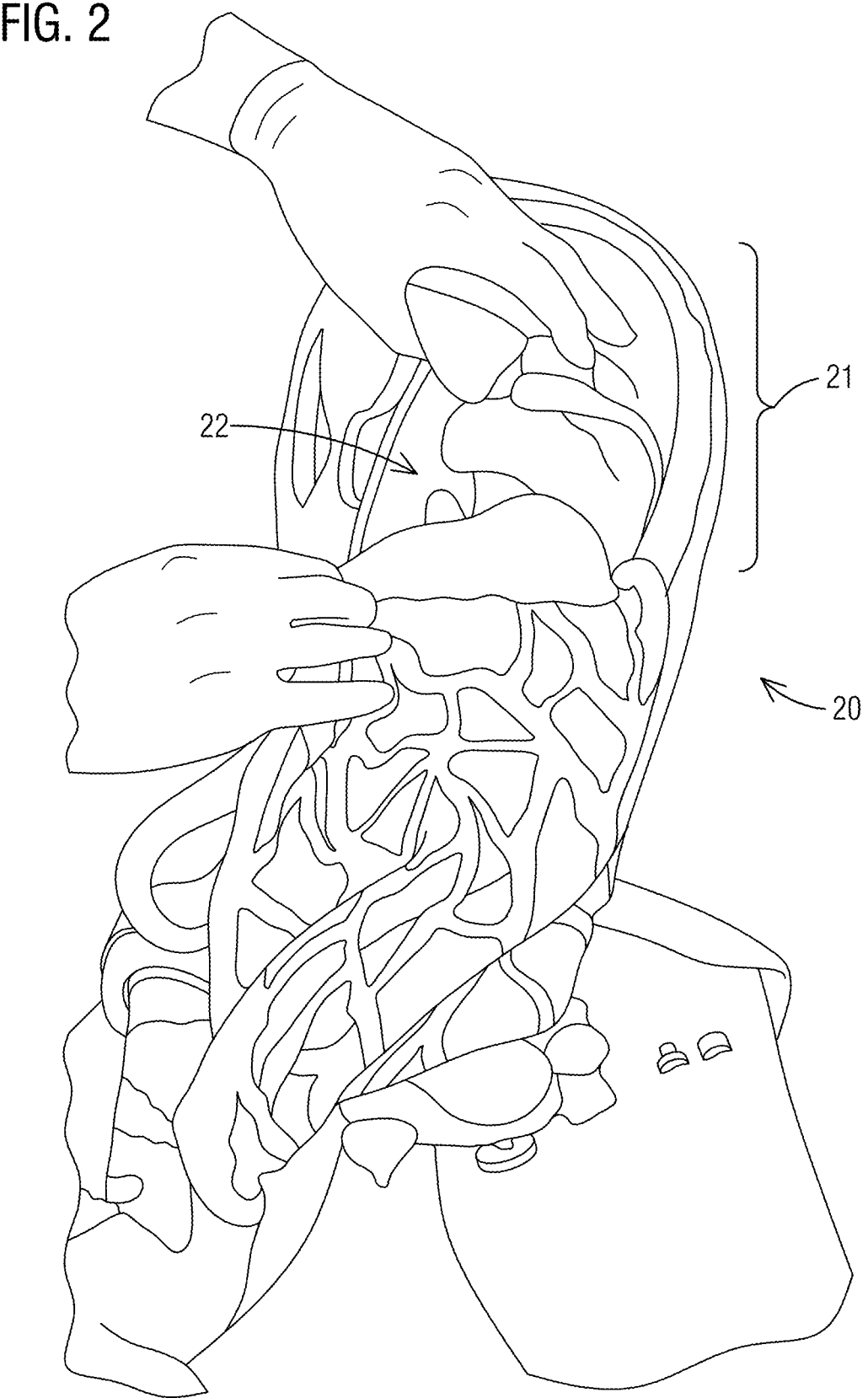
FIG. 2 shows a ventral perspective of a canine model with open abdomen exposing gastrointestinal organs.

FIG. 2 shows a ventral perspective view of a model embodiment 20 that includes a torso 21 with the abdomen 22 open to expose internal organs.

Figure 3:
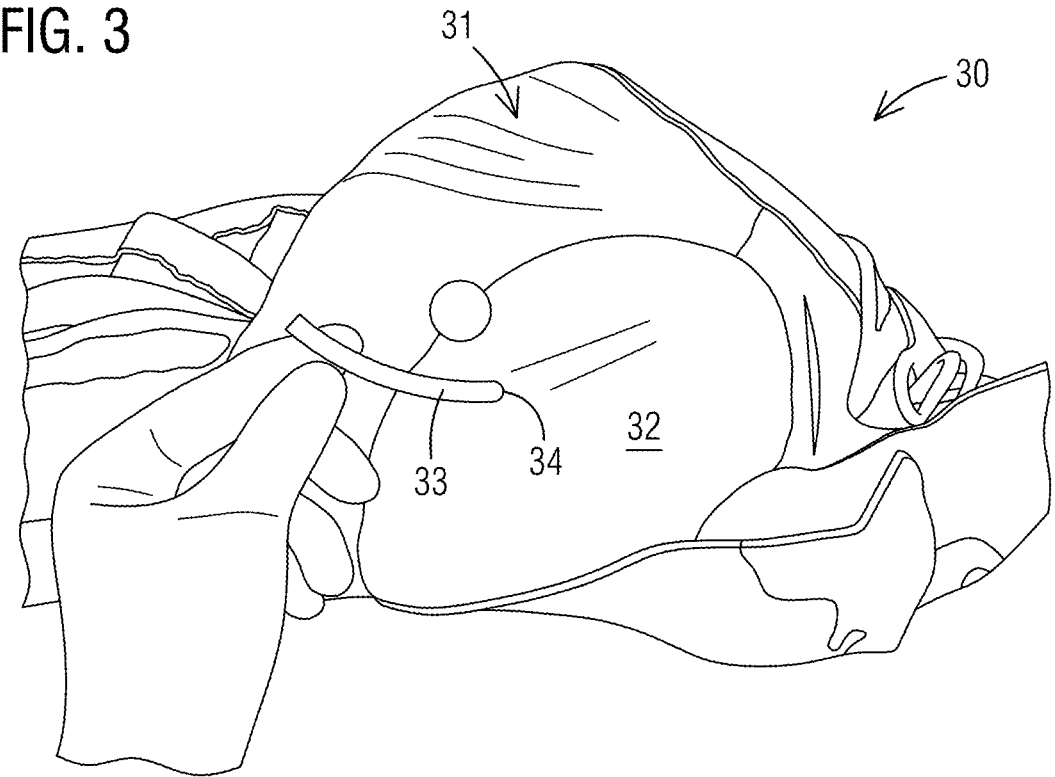
FIG. 3 shows a side perspective of a canine model configured for use in training pneumothorax treatment procedures.
Figure 4:
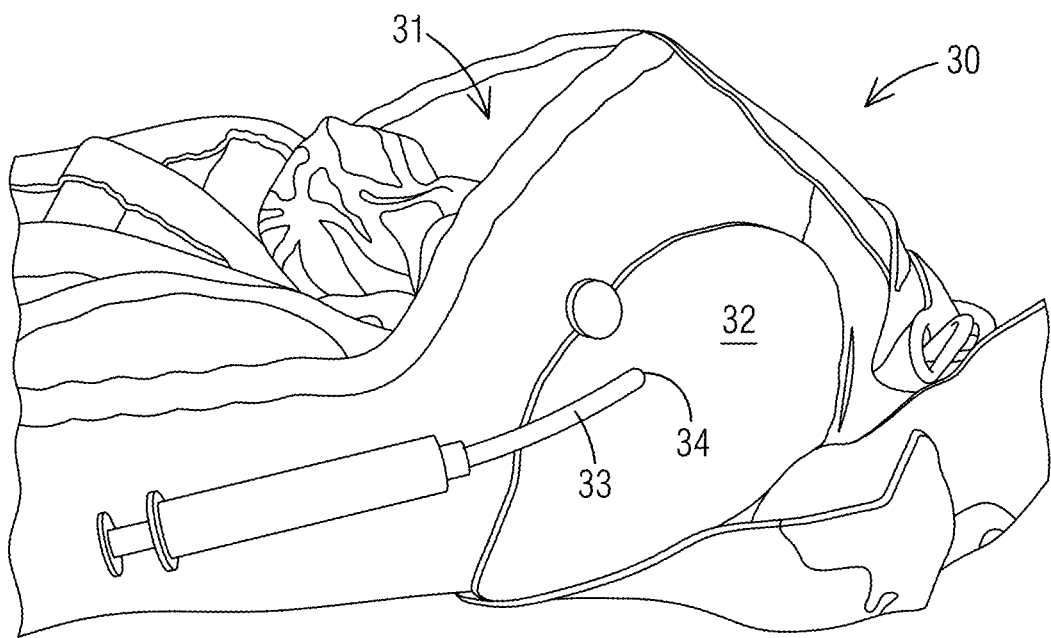
FIG. 4 shows a side perspective of a canine model configured for use in training pneumothorax treatment procedures.
Figure 5:
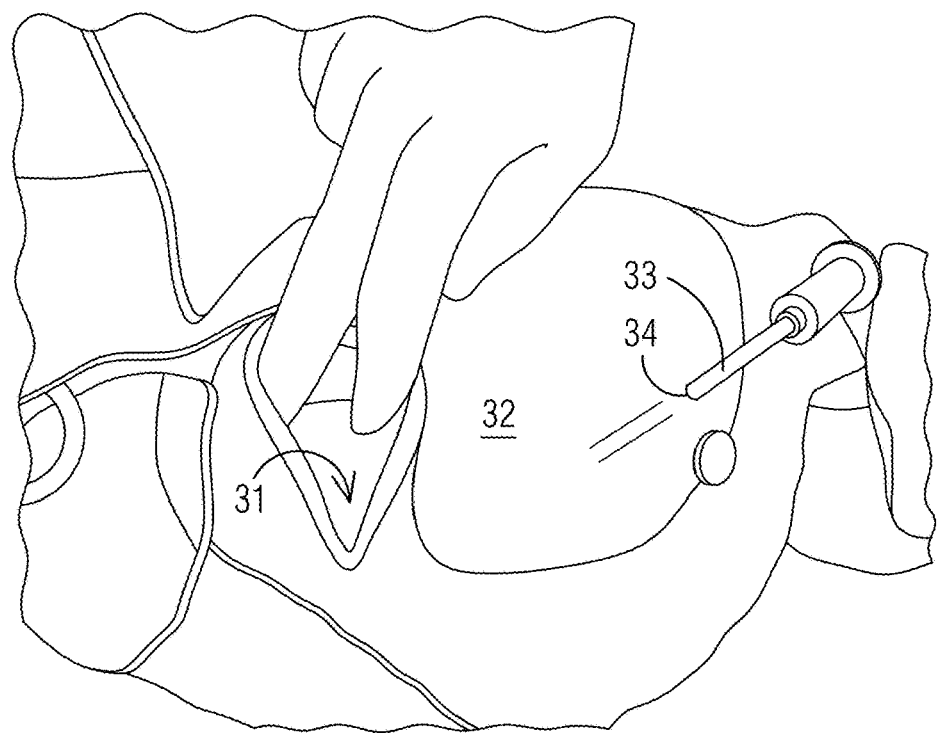
FIG. 5 shows a side perspective of a canine model configured for use in training pneumothorax treatment procedures.
Figure 6:
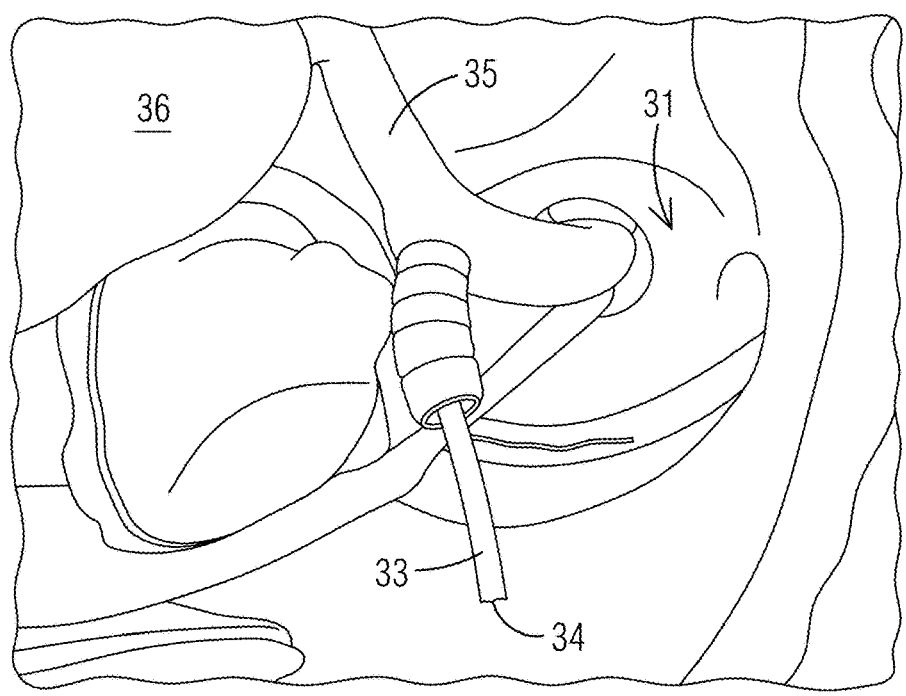
FIG. 6 shows a perspective view of the thoracic cavity of the model shown in FIGS. 3-4.
Figure 7:
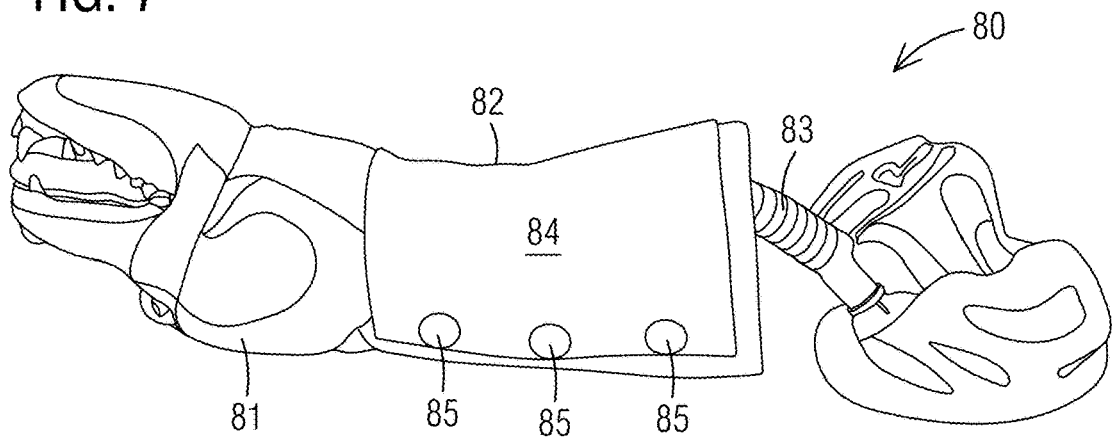
FIG. 7 shows a side perspective view of a canine airway access trainer model.

FIGS. 3-6 show a chest tube trainer canine model 30 that is adapted for training thoracentesis. A simulated thoracentesis can be performed on the surgical canine. FIG. 3 shows a canine torso that includes a thoracic cavity 31. A 1½ inch, 29 gauge needle can be inserted into the thoracic cavity 31 between the seventh or eighth intercostal space being sure to stay near the cranial aspect of the rib. A tube 33 can be placed in the hole 34 created in the thoracic cavity and air can then be drawn back into the syringe simulating pneumothorax. An insert to hold different fluids can be placed within the thoracic cavity, which will allow simulated blood or other fluid to be extracted from the "pleural space". The model 30 also includes a replaceable chest patch 32 that can be replaced when worn out to provide and maintain tactile feedback involved in insertion. FIG. 6 shows a perspective view of the cavity 31 with tube 33 shown passing into the cavity 31. Also shown in FIG. 6 is a trachea 35 which is attached to a lung component 36.

Figure 8:
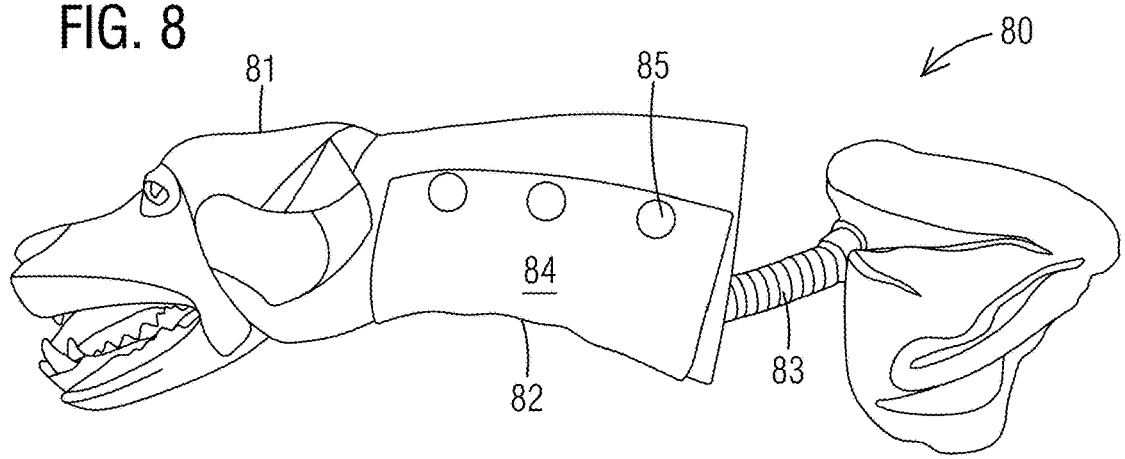
FIG. 8 shows a side perspective view of a canine airway access trainer model.
Figure 9:
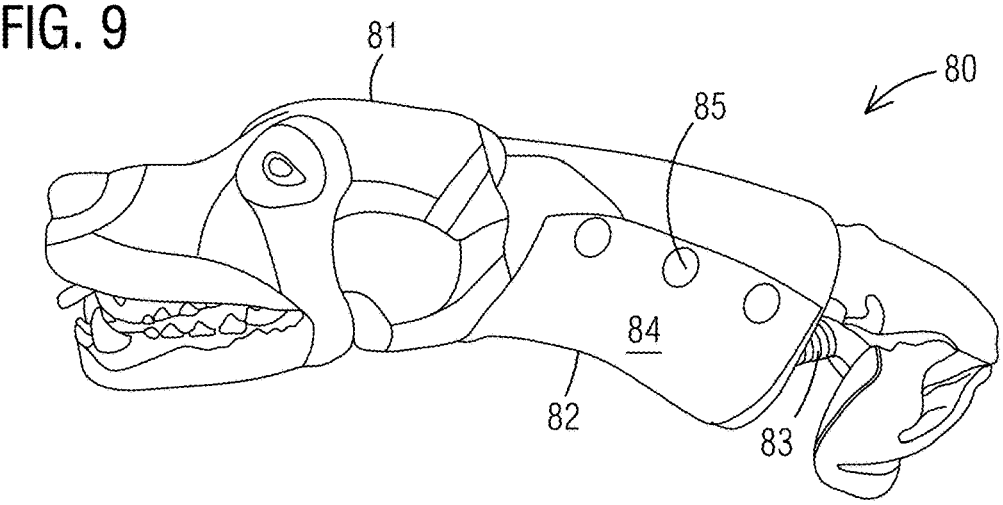
FIG. 9 shows a side perspective view of a canine airway access trainer model.
Figure 10:
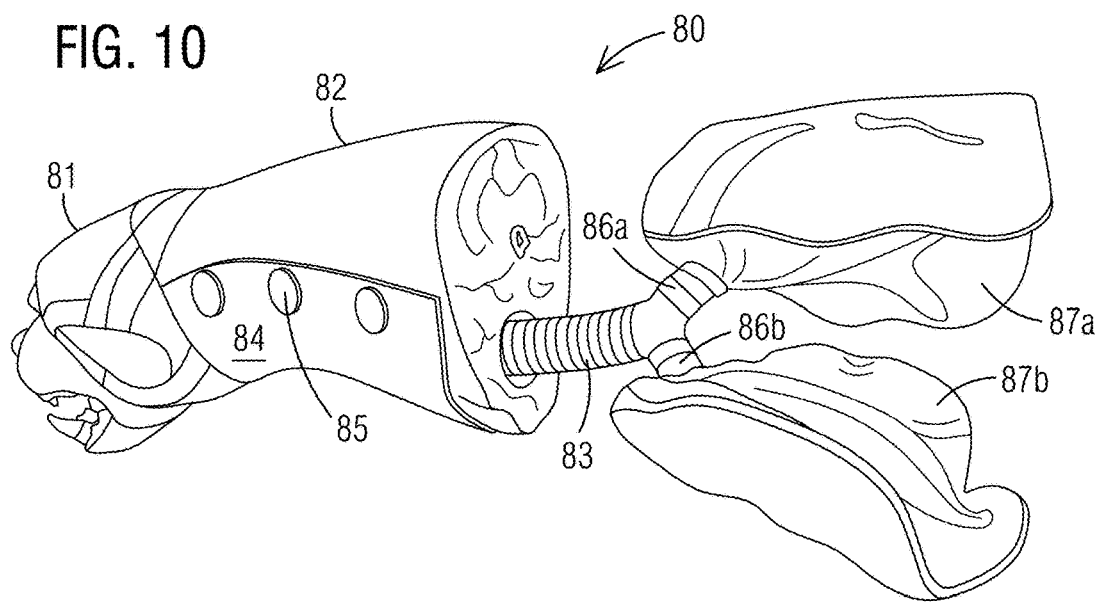
FIG. 10 shows a side perspective view of a canine airway access trainer model.
Figure 11:
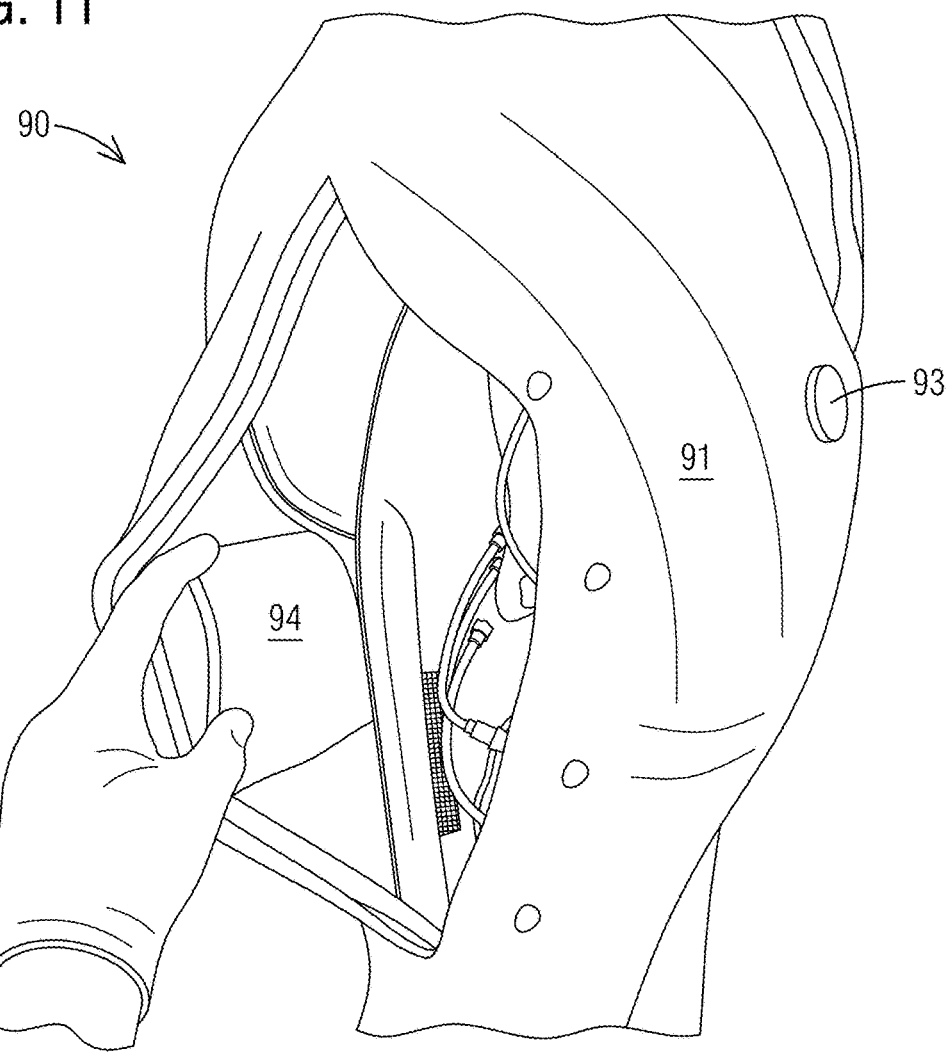
FIG. 11 shows a side perspective of canine model with removable abdomen cover.
Figure 12:
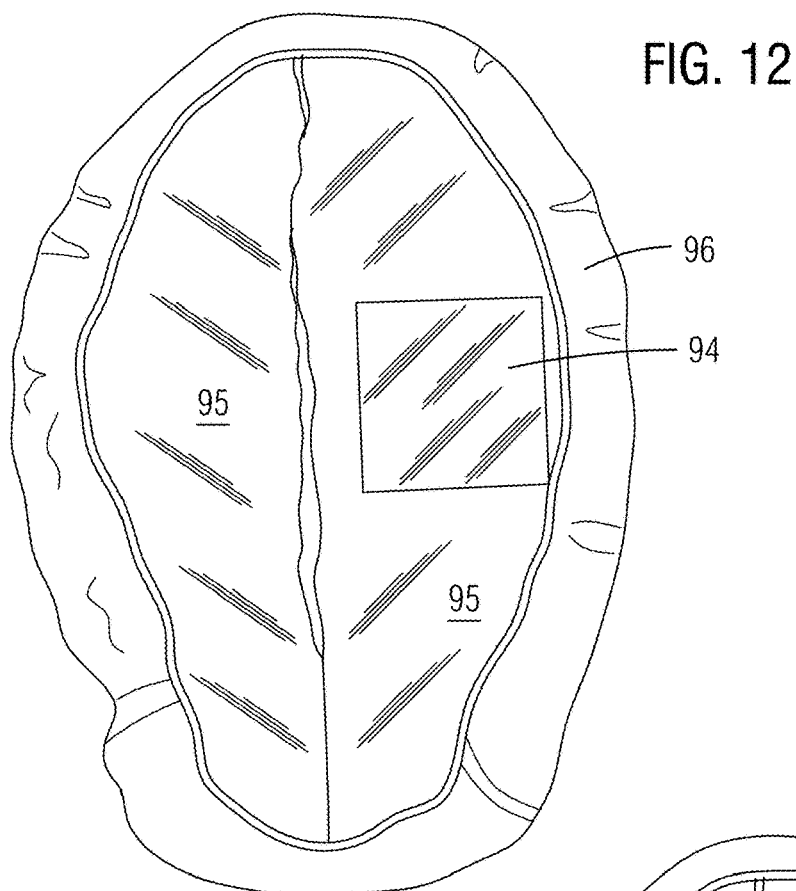
FIG. 12 shows a view of the inner wall of the abdomen cover shown in FIG. 11.
Figure 13:
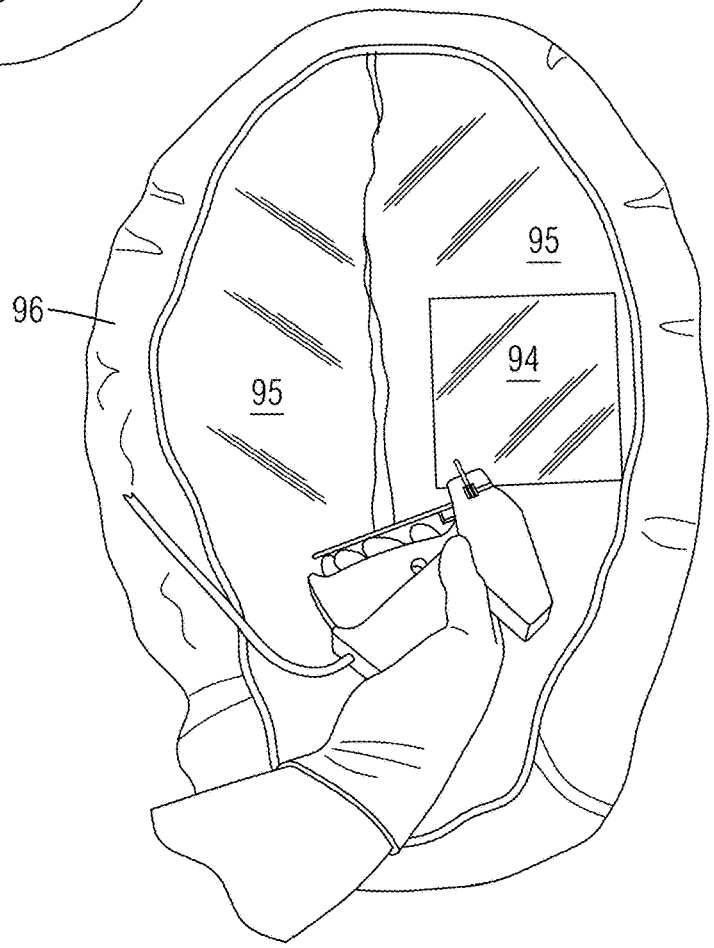
FIG. 13 shows a view of the inner wall of the abdomen cover of FIG. 12 and attachment of wall patch.
Figure 14:
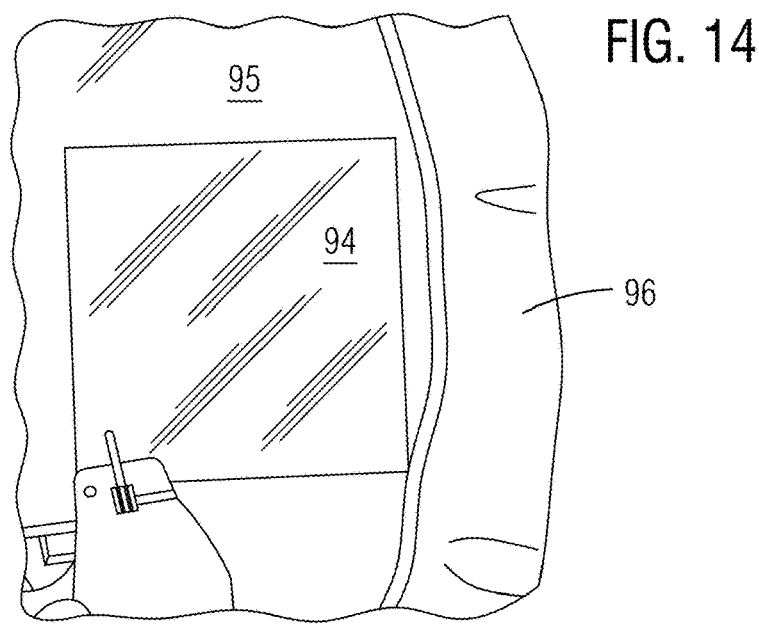
FIG. 14 is a close up of the wall patch attachment shown in FIG. 13.

FIGS. 7-10 show an embodiment that is designed for training canine intubation and other airway access procedures. The model 80 includes a head 81 and neck 82 and a trachea 83 that fluidly connects with the throat portion of the head 81. The model 80 also includes a replaceable patch 84 that is held in place by fasteners 85. The patch 84 is located in the anterior neck region and is configured to practice airway access by puncturing or incising the patch 84. As shown, the fasteners 85 represent buttons secured to the neck 82 that pass through slits in the patch 84. The fasteners shown are buttons but could take one of several forms, including Velcro, zippers, latches, etc. The trachea 83 branches at its distal end into two bronchi portions 86a,b. Fluidly connected to the distal end of the bronchi are two separate lung components 87a,b. See FIG. 10. FIG. 8 shows that the trachea component fluidly connects to the mouth 88, and that the throat 89 includes an epiglottis 89' component.

Figure 15:
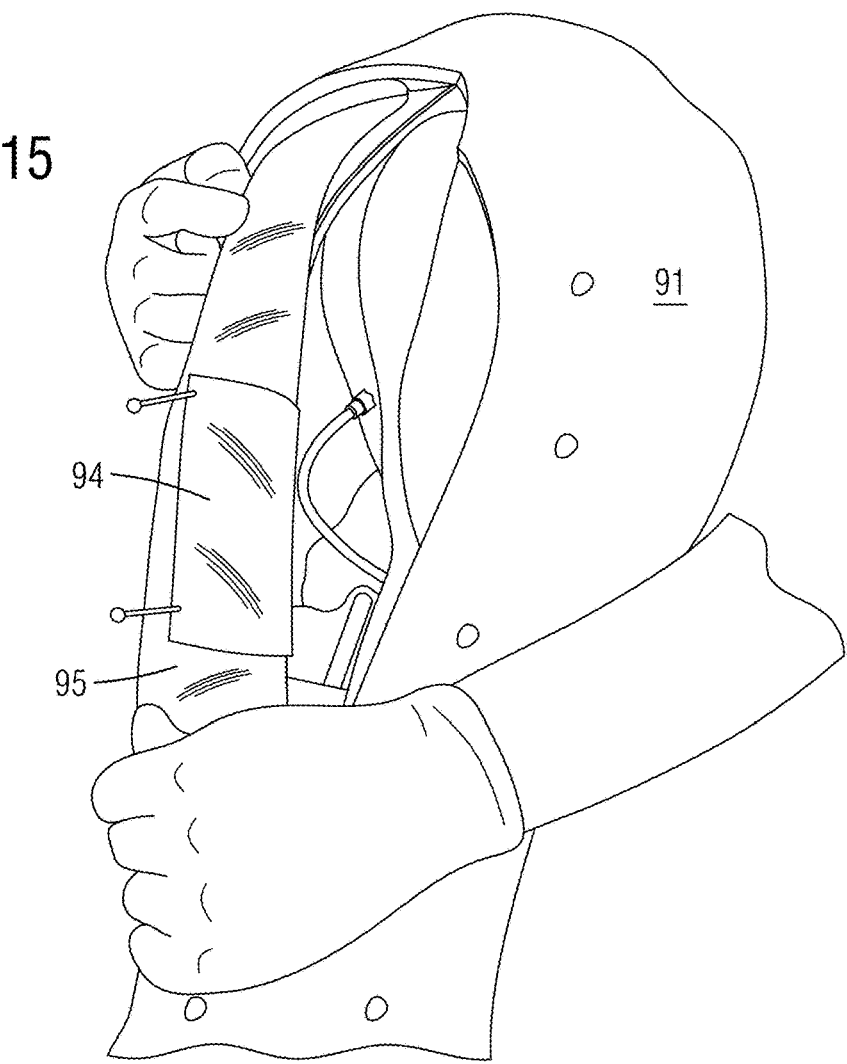
FIG. 15 shows a side perspective view of the model shown in FIG. 11 with portion of abdomen cover pulled open to reveal placement of wall patch.
Figure 16:
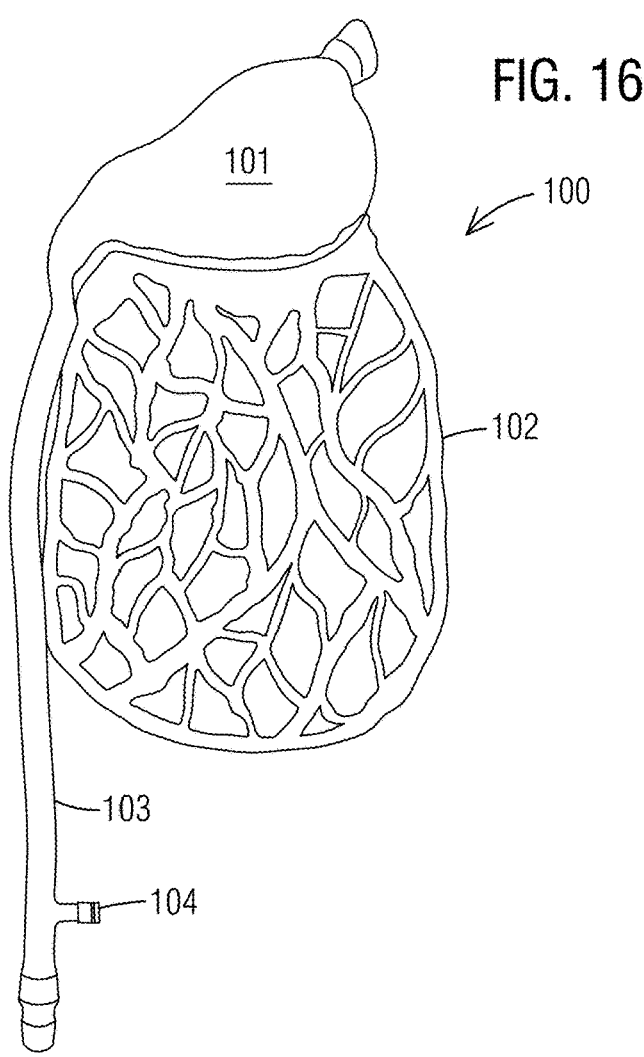
FIG. 16 is a plan view of a canine gastrointestinal (GI) tract model.
Figure 17:
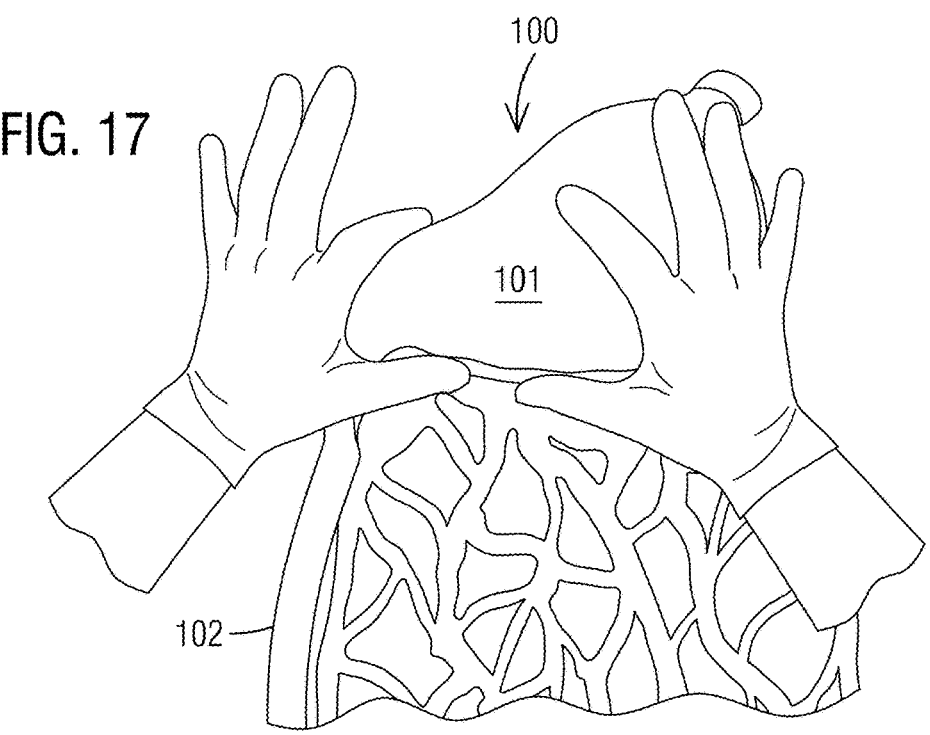
FIG. 17 shows the GI tract model of FIG. 16, with stomach component inflated.

FIGS. 11-15 show a gastroplexy trainer model embodiment 90 that is particularly useful in training for conducting a gastropexy procedure on a canine. The model also includes a removable abdomen cover 91 that is held to the torso via fasteners 93. Attached to internal surface of the abdomen cover 91 is an abdomen wall patch 94. The wall patch 94 serves as an attachment point during the gastropexy procedure, and is replaceable to maintain reproducibility as it gets worn. The abdomen cover 91 includes muscle component 95 (see FIG. 12-13) that is attached to the inner subdural fat layer 96 of the abdomen cover 91. As shown in FIG. 15, the wall patch 94 can be replaced and attached to the muscle component 95 of the abdomen cover 91. The wall patch can be attached to the subdural fat layer via a suitable attachment means, such as sutures or staples. FIG. 17 shows the abdomen cover 91 spread open to show the inner surface with wall patch 94 attached. The various soft tissue components shown in FIGS. 11-17 are made of synthetic tissue to simulate properties of the various enumerated components. The following represents one embodiment of using the model 90.

1. The procedure involves Make a skin incision along the midline to the xyphoid to allow exposure of the stomach and to allow visualization of the right transverse abdominal muscle along the right abdominal wall.
2. Stabilize the stomach. Make a 3-4 centimeter incision in the pyloric antrum through the seromuscular layer parallel to the long axis of the stomach. Avoid penetrating the lumen when making this incision.
3. Make an incision of equal length through the peritoneum and transverse abdominal muscle along the right ventral lateral body wall approximately 8 centimeters dorsal to the midline caudal to the last rib.
4. Appose the dorsal cranial edge of the muscular abdominal incision to the dorsal edge of the stomach incision suture with monofilament suture.
5. With the initial knot at the cranial edge, leave one end long and a mosquito hemostat can be attached to this end to allow identification.
6. Continue to suture in a simple continuous pattern bringing the dorsal edges of both incisions together.
7. When the caudal end of the incision is reached, continue the suture pattern cranially apposing the ventral portion of both edges.
8. Finish the pattern at the cranial end by tying it off to the suture retained from initial knot.
9. This completes the gastropexy procedure. The skin can be closed routinely if no further procedures are to be performed.

Figure 18:
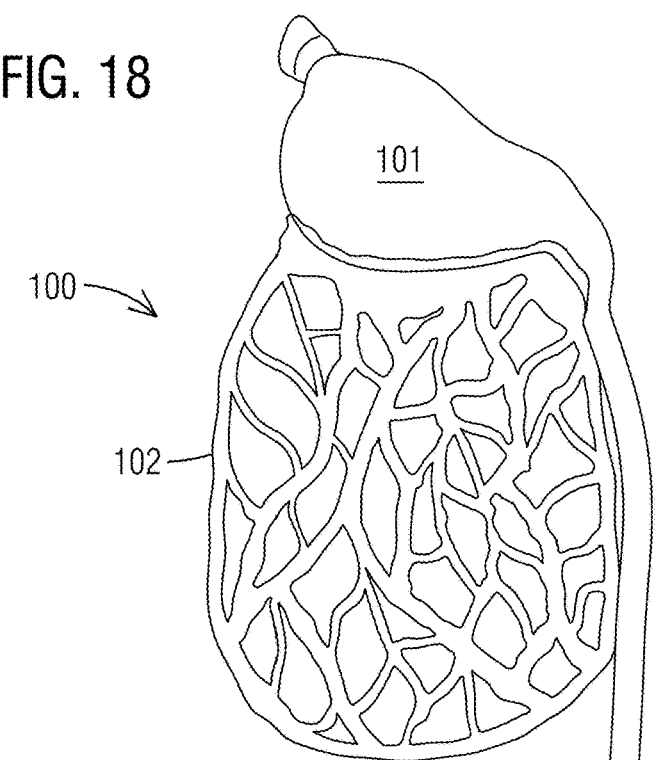
FIG. 18 shows a plan view of the canine GI tract model opposite the view shown in FIG. 16.
Figure 19:
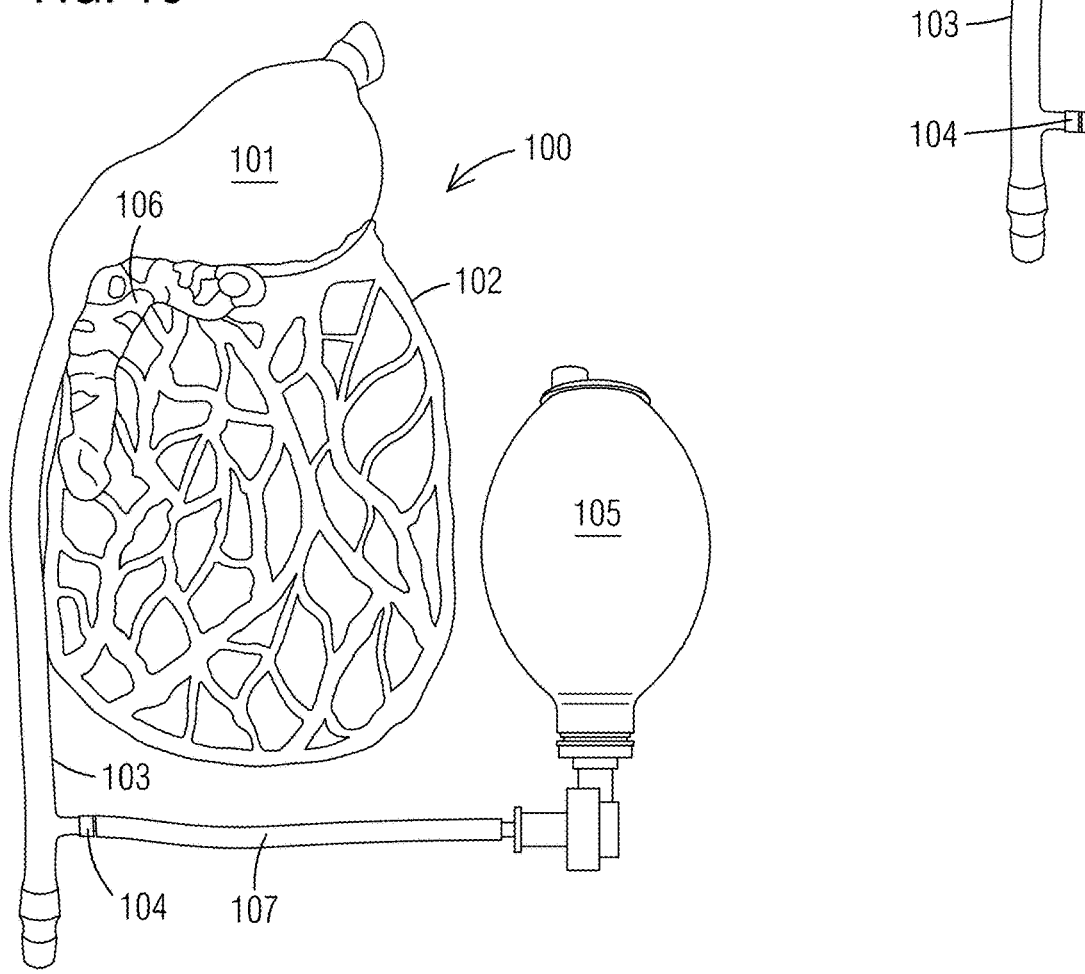
FIG. 19 shows the GI tract model assembled with conduit and reservoir for inflating the stomach component.
Figure 20A:
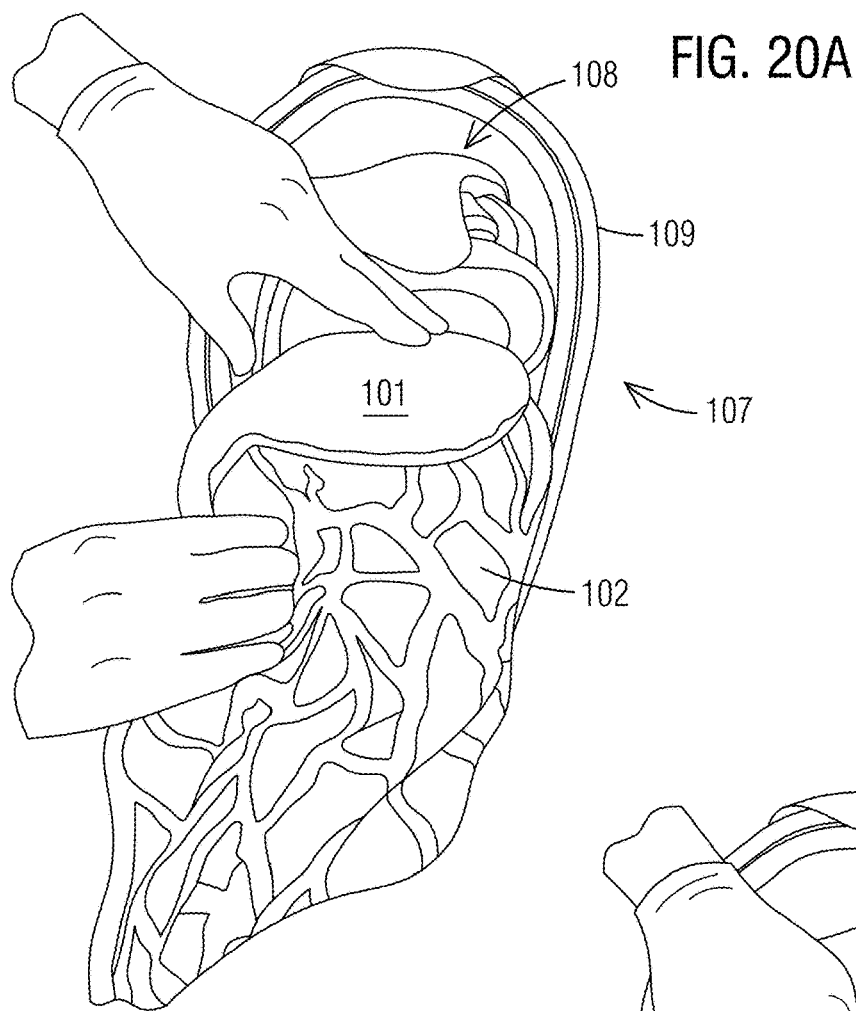
FIG. 20A-D shows a GDV trainer model.
Figure 20B:
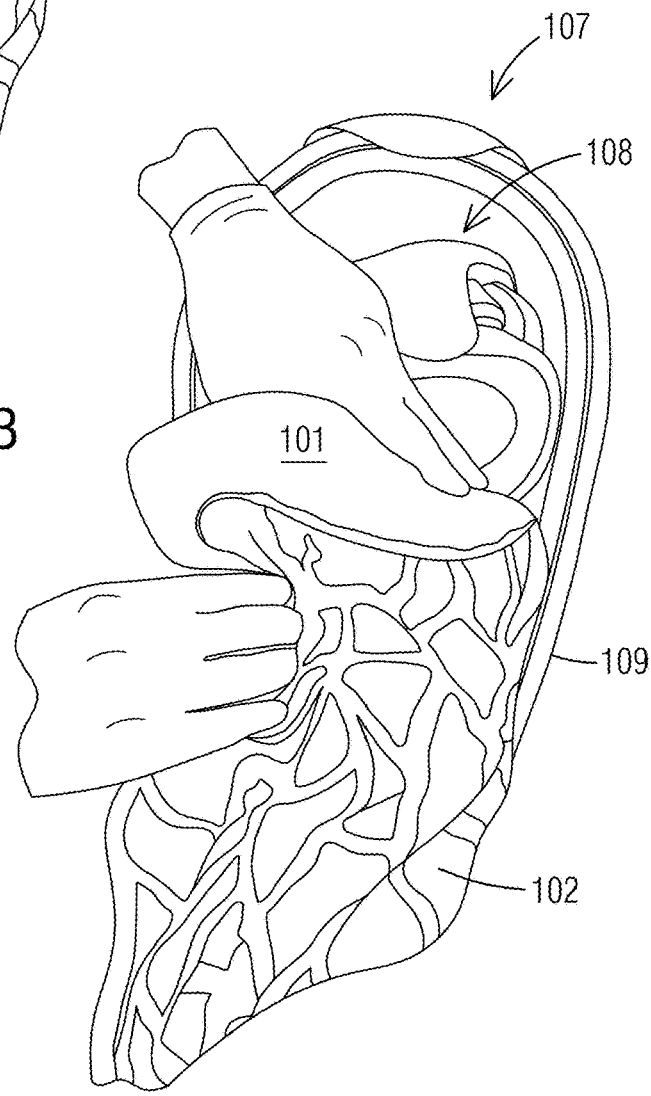
Figures 20C, 20D:
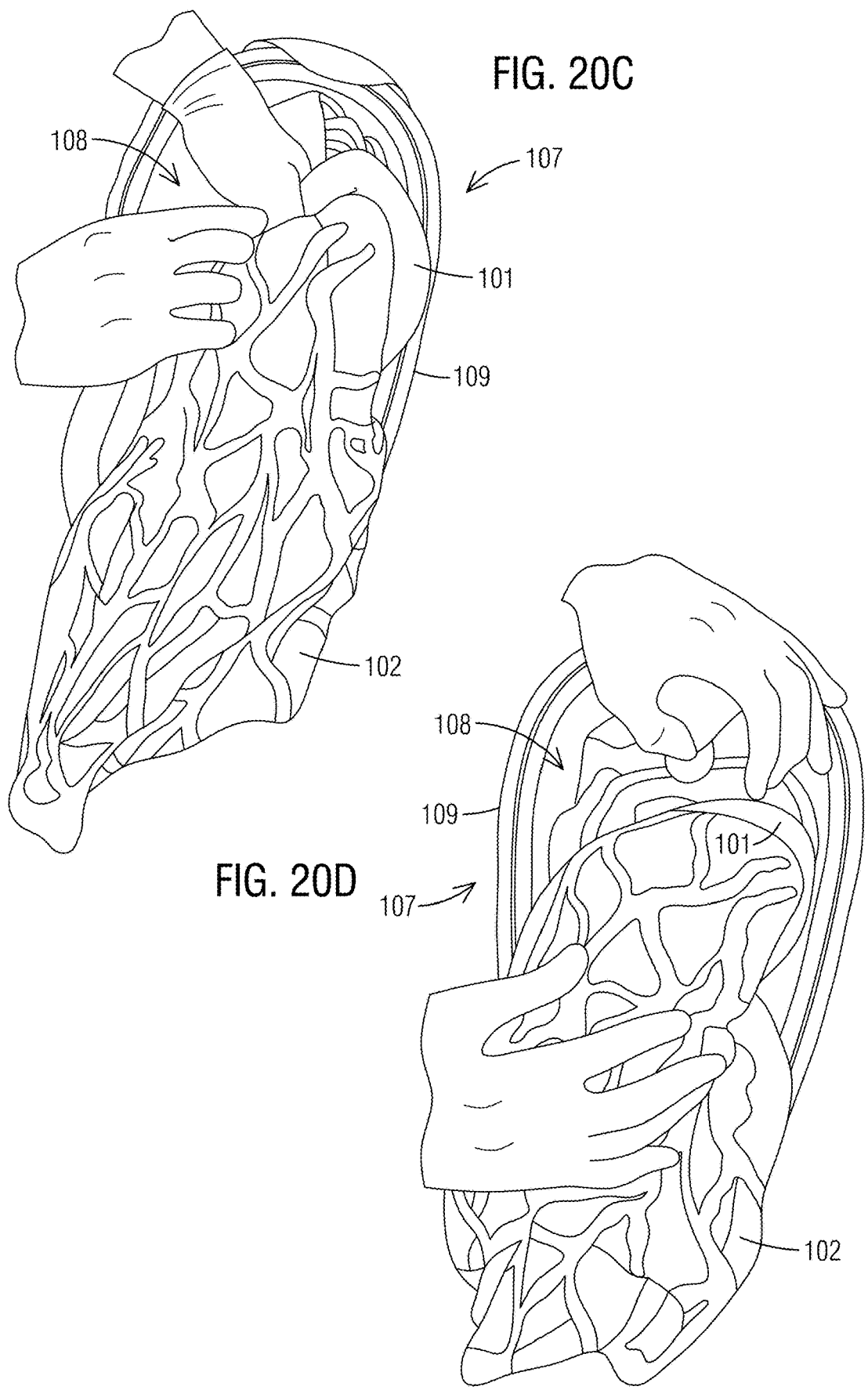
Figure 21A:
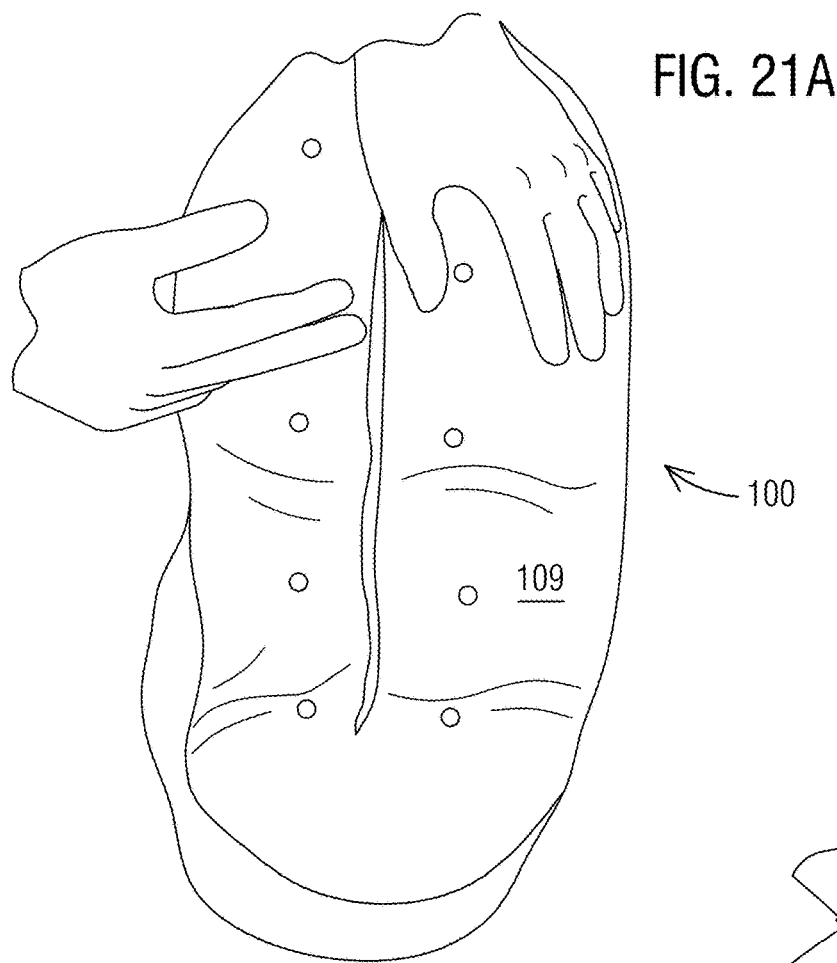
FIGS. 21A-E show the GDV trainer model shown in FIG. 20 with abdomen cover in place.
Figure 21B:
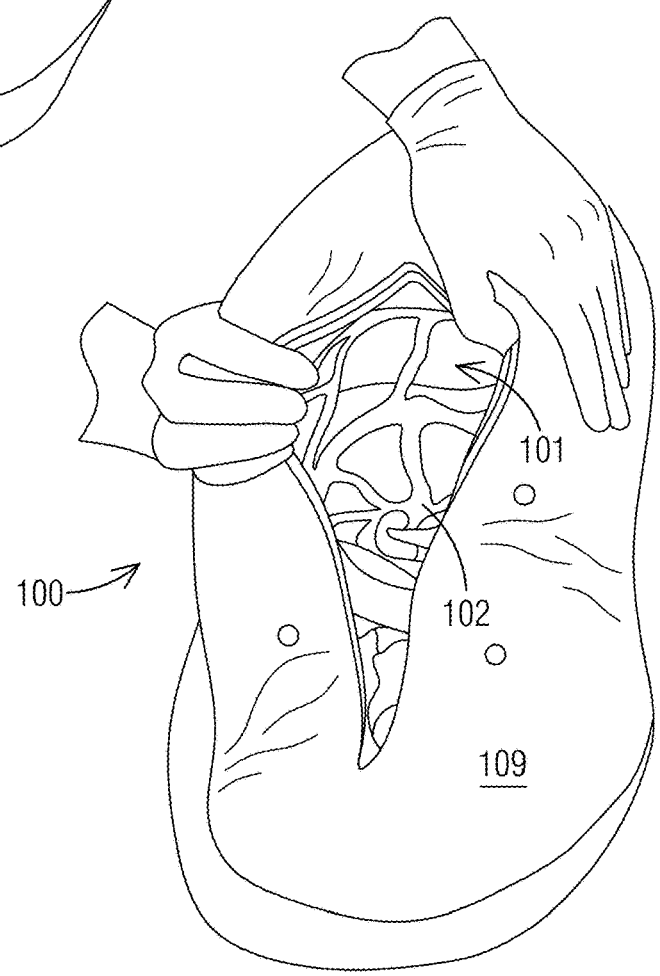
Figure 21C:
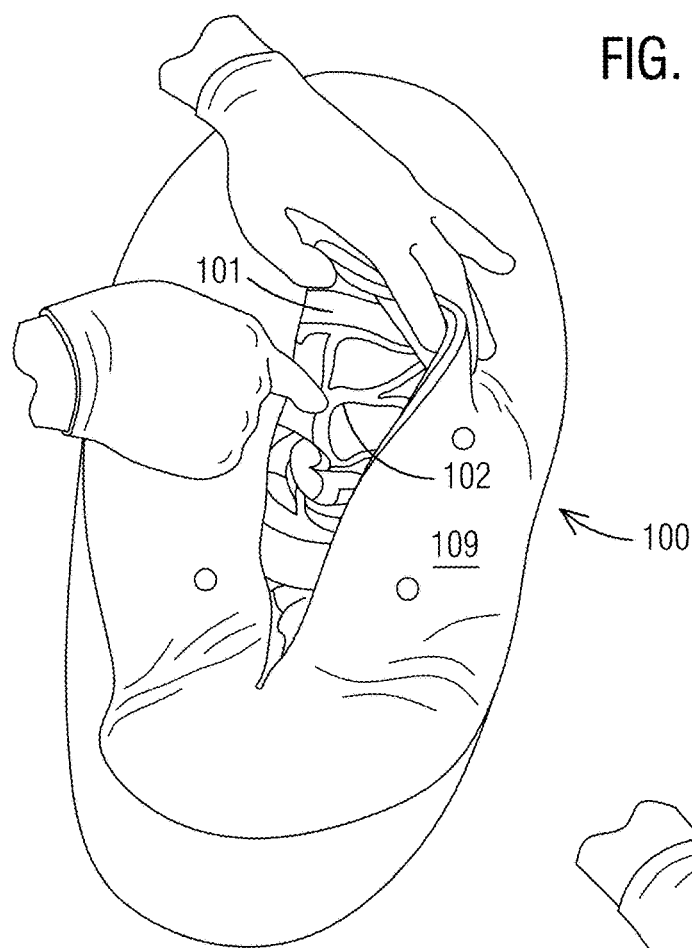
Figure 21D:
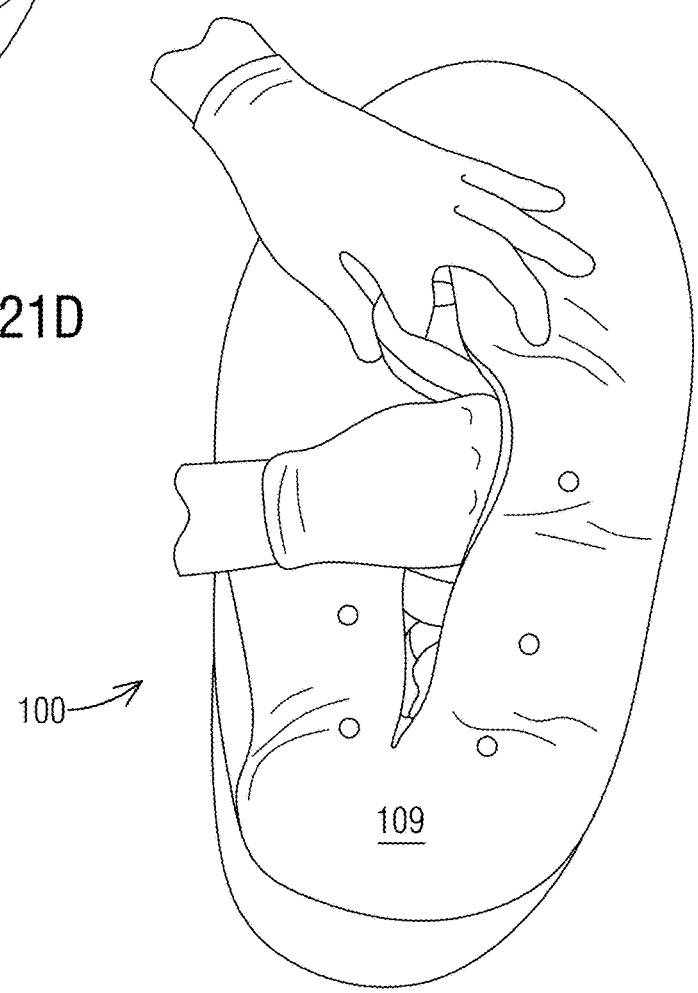
Figure 21E:
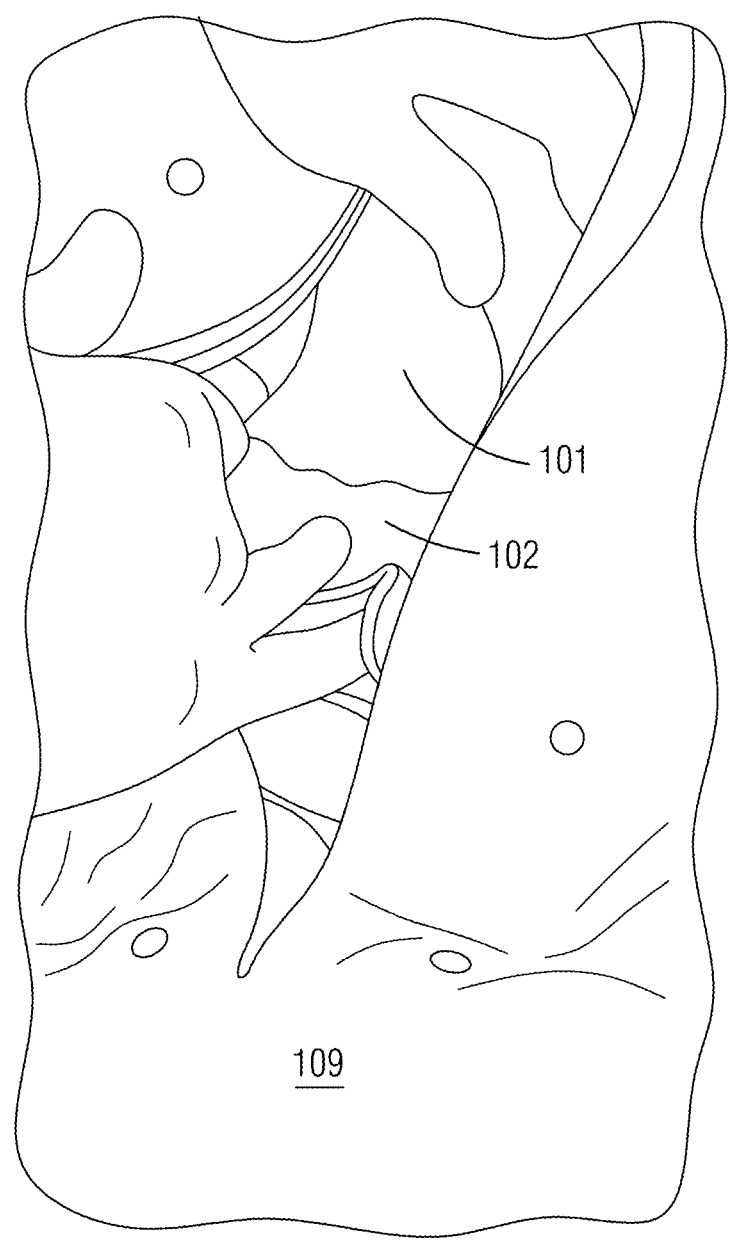
Figure 22:
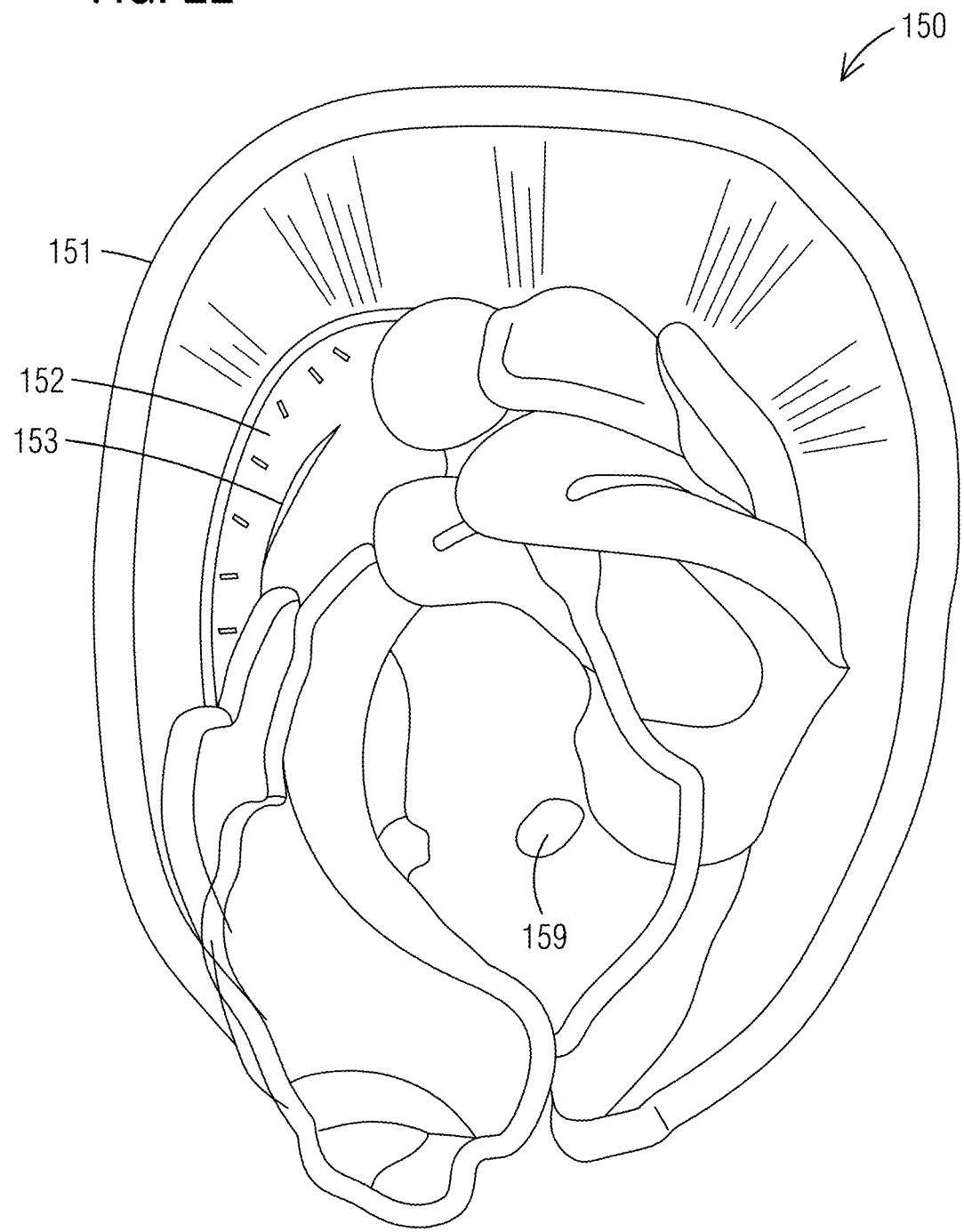
FIG. 22 shows a diaphragm model for training in procedures for repairing a diaphragmatic hernia.

FIGS. 16-21 shows a gastric dialation and volvulus (GDV) model 100 to provide training for corrective GDV procedures. The model includes an inflatable stomach component 101 that is optionally connected to omentum 102. The stomach component 101 includes a distal gastrointestinal tract portion 103, which includes a port 104 for inflation. FIGS. 17 and 18 show the GDV model 100 with an inflated stomach component 101. FIG. 19 shows a bladder 105 that is fluidly connected to the port 104 via tube 107. FIG. 19 also shows the GDV model 100 with an optional pancreas component 106 attached to the stomach component 101 and omentum 102. FIG. 22 shows the stomach component 101 positioned within a canine model 107 having an abdominal cavity 108 with an abdominal cover 109. The model 100 simulates GDV by being twistable and inflatable in the abdominal cavity. The model 100 enables visual recognition of the GDV condition and practice of untwisting the stomach component 101 to simulate the corrective procedure. The incremental steps of how the GDV model 100 can be utilized to train recognition and treatment of GDV is provided in FIGS. 20 and 21. FIG. 20A shows the stomach component 101 in the normal state. FIG. 20B shows the user beginning to twist the stomach component 101. FIG. 20C shows the user nearly completed in twisting the stomach component 101. FIG. 20D shows the complete twisting of the stomach component 101 thereby setting up a training scenario for diagnosing and correcting the twisted stomach component 101. FIG. 21A shows the model 100 with an abdomen cover component 109 placed over the abdomen following the set up procedure of FIGS. 20A-D. The abdomen cover 109 is incised down the central line and opened to expose the stomach component 101 with omentum 102 (FIG. 21B). The stomach component 101 is decompressed (FIG. 21C) and then untwisted (FIG. 21D and FIG. 21E).

Figure 23:
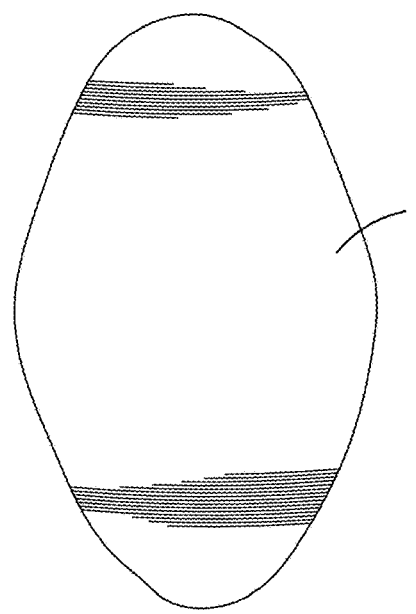
FIG. 23 shows the tissue section that is attached to the diaphragm model which will be slit to resemble a hernia section.
Figure 24:
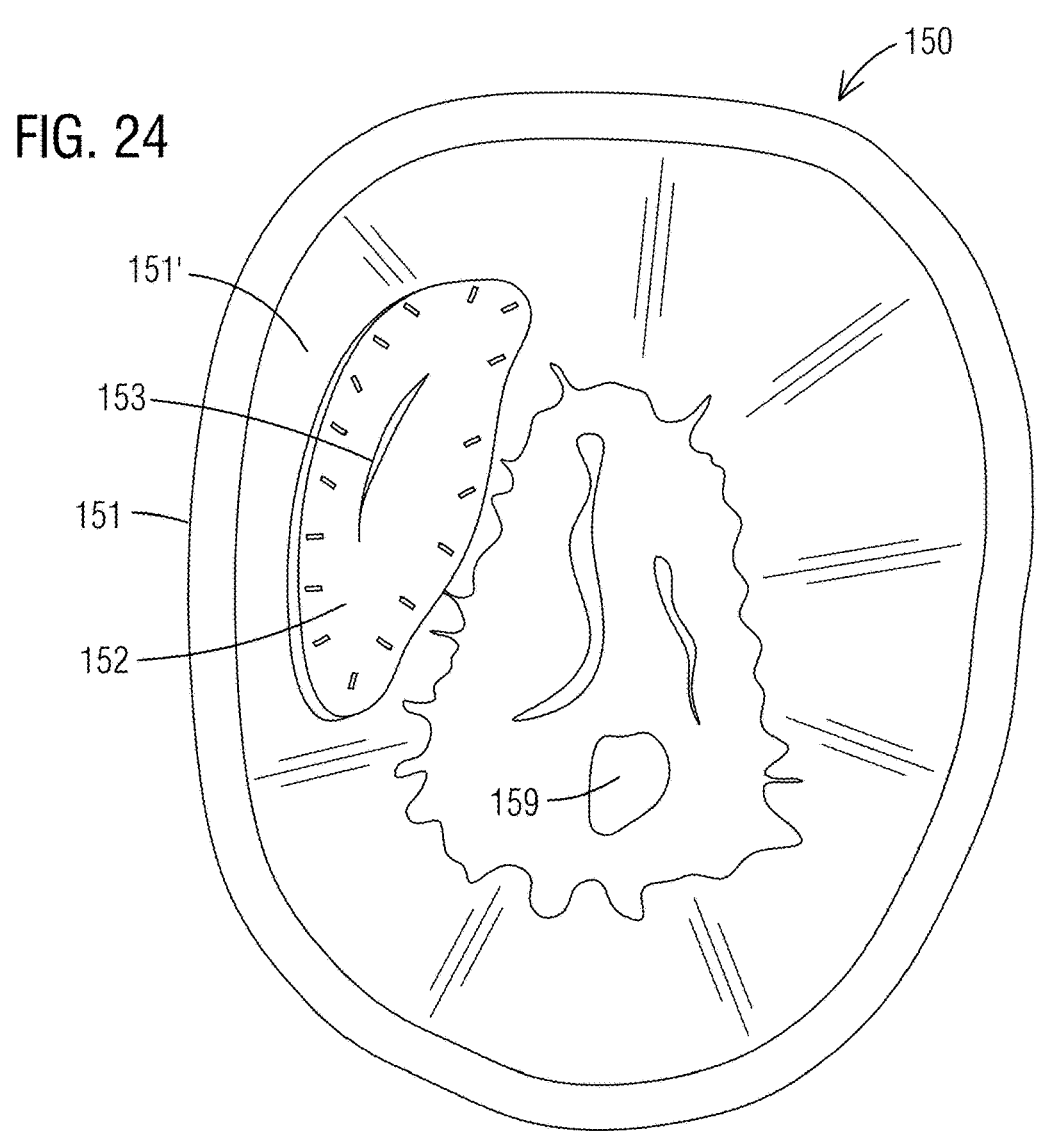
FIG. 24 shows the diaphragm model of FIG. 22 with replaceable hernia section attached.
Figure 25:
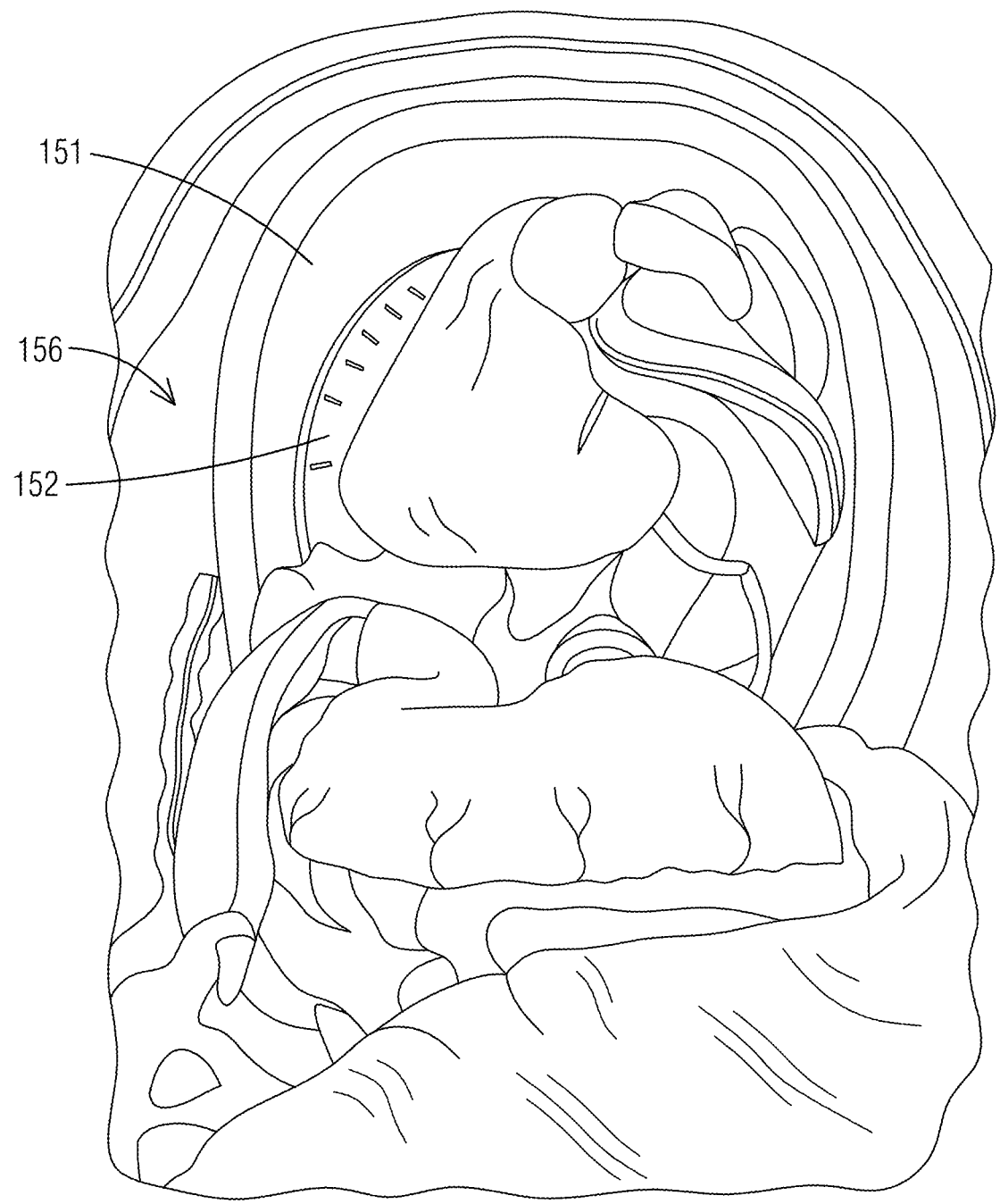
FIG. 25 shows the interior of the diaphragm model of FIG. 22 with various abdominal organs.
Figure 26:
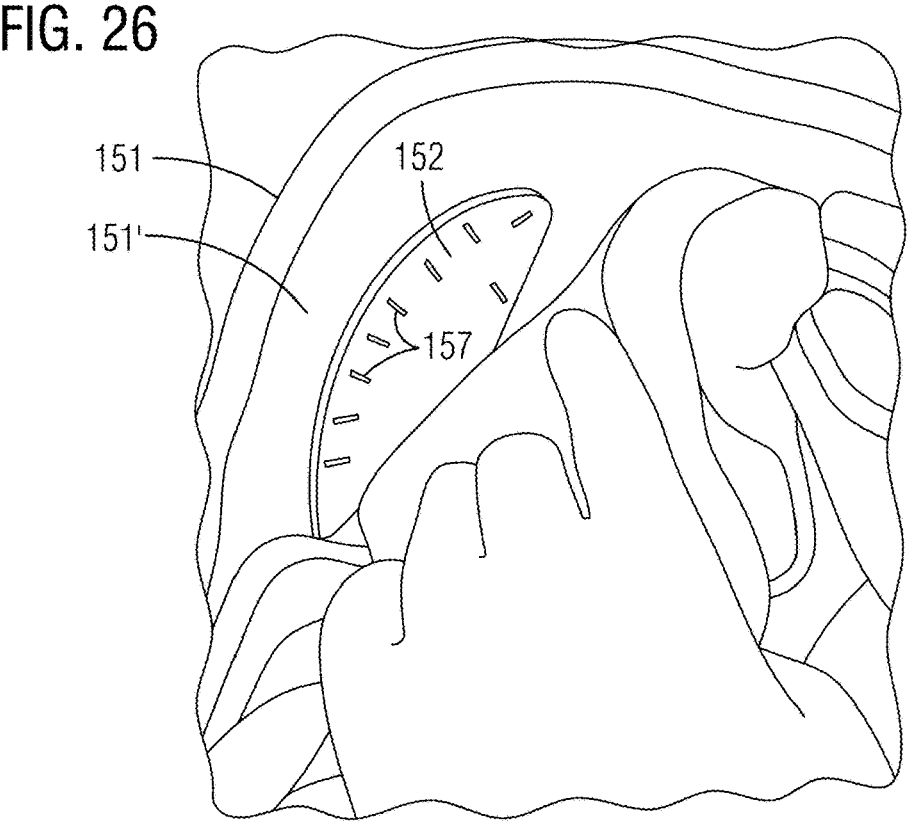
FIG. 26 shows the interior of the diaphragm model of FIG. 22 with organs pulled back to see attached hernia section.
Figure 27:
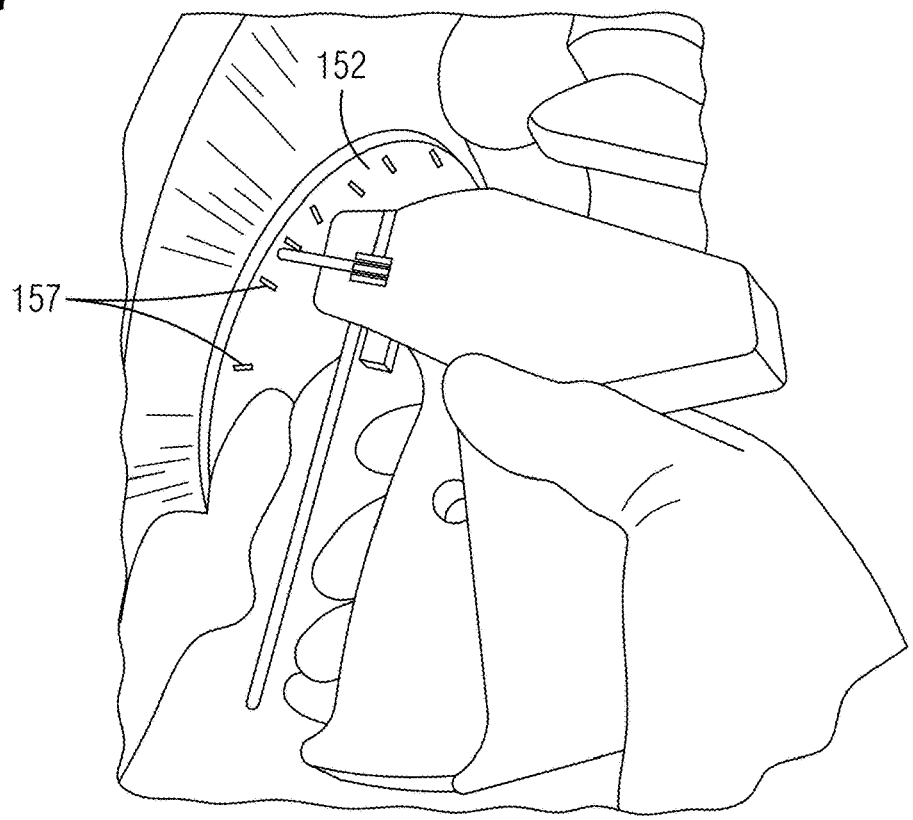
FIG. 27 shows attachment of hernia section to diaphragm wall.
Figure 28:
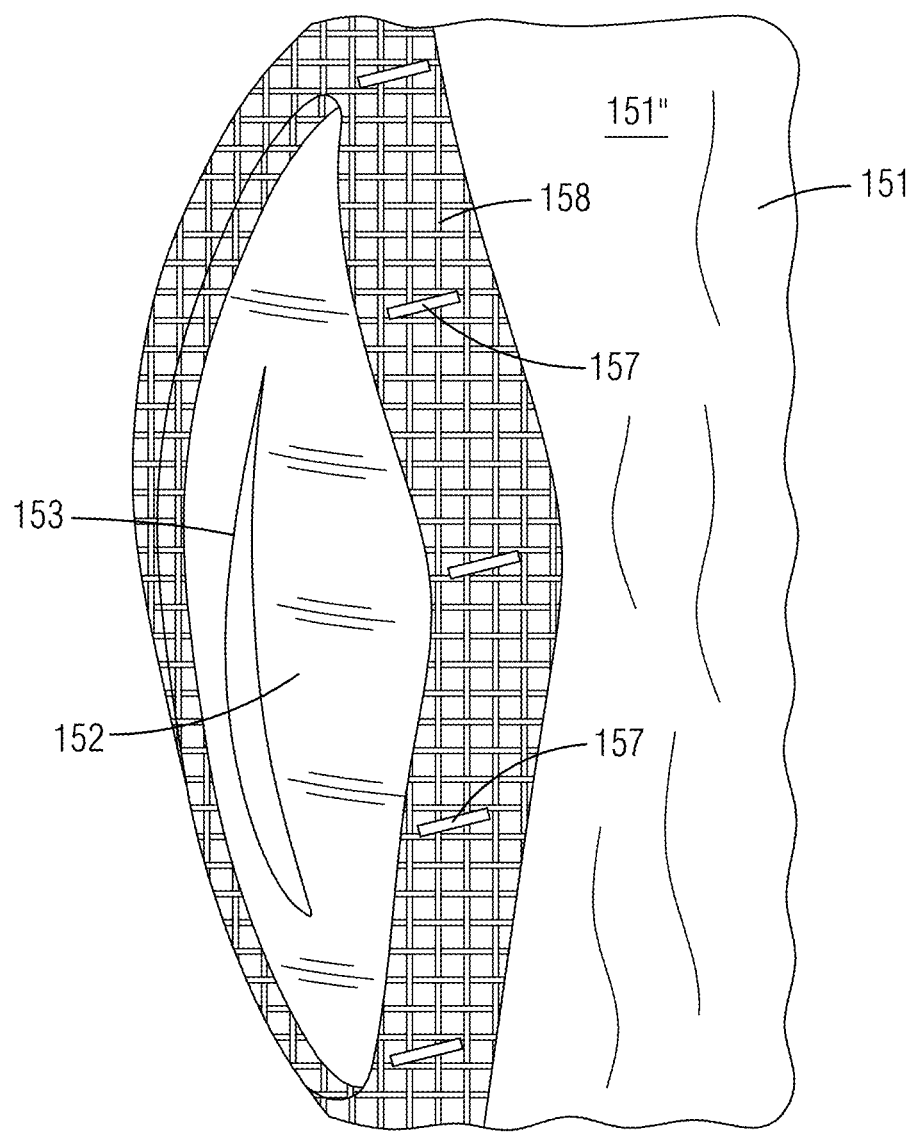
FIG. 28 shows an outer wall of the diaphragm model with reinforcement structure.

FIGS. 22-28 show a diaphragm hernia model 150. The model 150 includes a diaphragm component 151 that includes a replaceable diaphragm hernia section 152. The hernia section 152 includes a slit 153 representing the hernia. The model 150 allows for training of corrective procedures to sow together the tissue forming the slit 153. FIGS. 24-30 show individual components of the model 150 and assembly. FIG. 23 shows the hernia section 152 as separate piece of simulated tissue prior to attachment and being slit. FIG. 24 shows the hernia section 152 attached to an inner wall 151' of the diaphragm 151. The diaphragm component 151 includes an aperture 159 that allows passage of esophagus and vasculature from thorax to abdomen. The diaphragm component 151 can expand and contract with lung expansion. The diaphragm 151 sits within a thoracic cavity 156 comprising a muscle and rib shell as shown in FIG. 25 along with other internal organs. FIG. 26 shows a close-up of the diaphragm component 151 and hernia section 152 with attachment means (e.g. nylon staples) 157 that attach the hernia section 152 to the inner wall 151'. FIG. 27 shows an example of attaching the hernia section 152 with the attachment component 157. FIG. 28 shows the outer wall 151" of the diaphragm component 151 wherein a reinforcement structure 158 is attached to assist in maintaining the structural integrity of the diaphragm 151 for repeat removal and attachment of the hernia section 152. The reinforcement structure 158 can take many forms such as another layer of muscle tissue or as shown, a lattice through which the attachment component 157 can be passed through. The various soft tissue components shown in FIGS. 22-28 are made of synthetic tissue to simulate properties of the various enumerated components.

In another embodiment, the canine model includes a hinge on a dorsal aspect that allows diaphragm to be pivoted to access the thorax.

Figure 29:
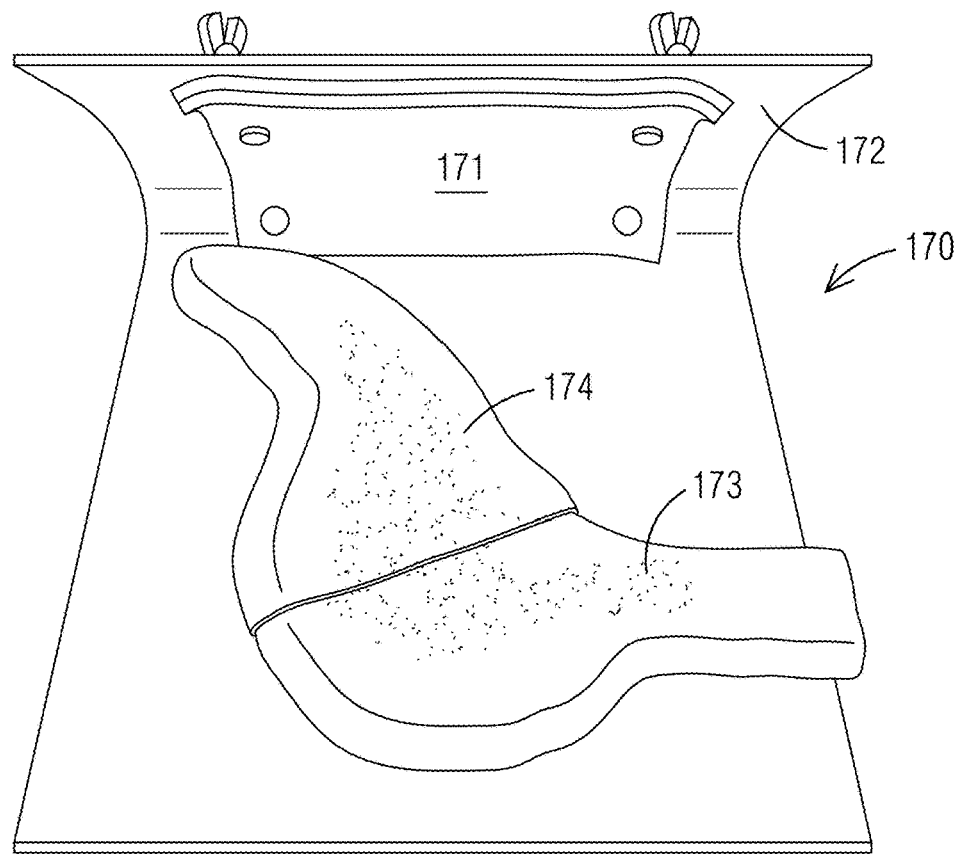
FIG. 29 shows a gastropexy model system.
Figure 30:
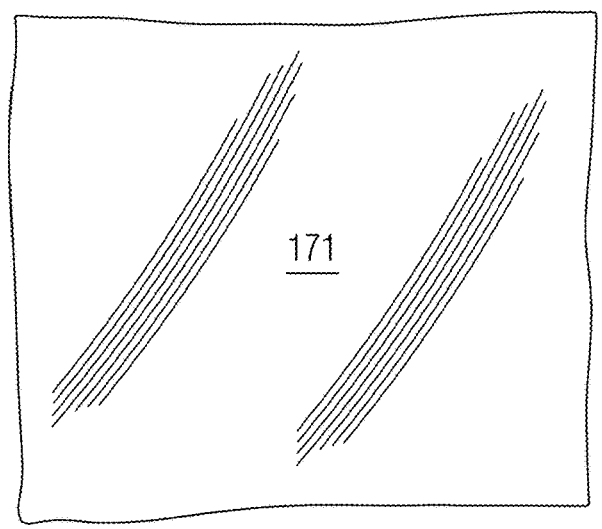
FIG. 30 shows a plan view of the tissue portion used in the gastropexy model system shown in FIG. 29.
Figure 31:
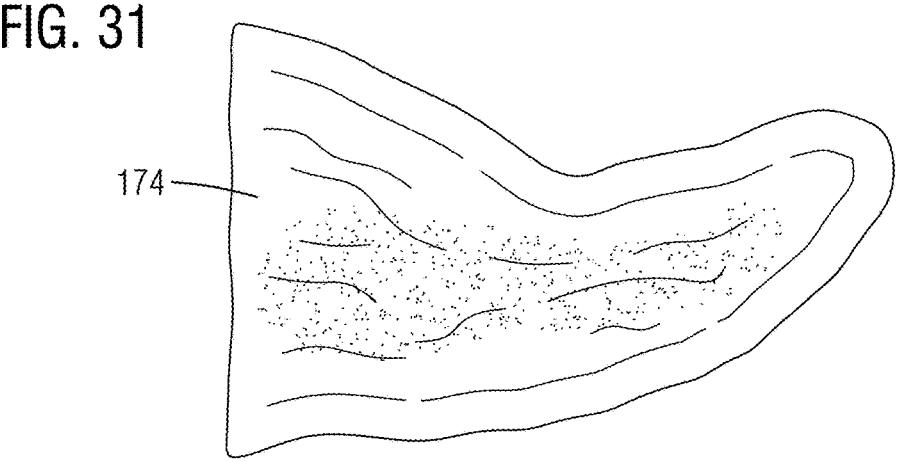
FIG. 31 shows a plan view of a replaceable stomach sleeve.
Figure 32:
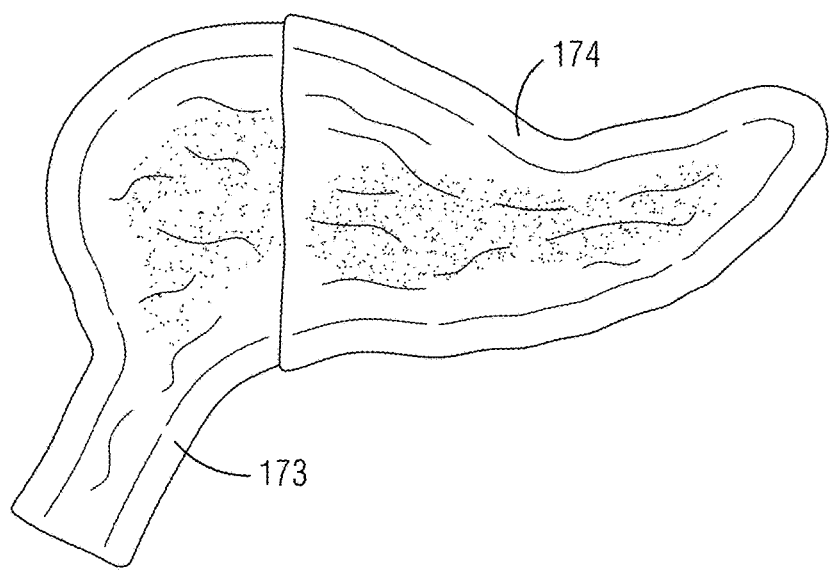
FIG. 32 shows a plan view of the replaceable stomach sleeve associated with a stomach component.
Figure 33:
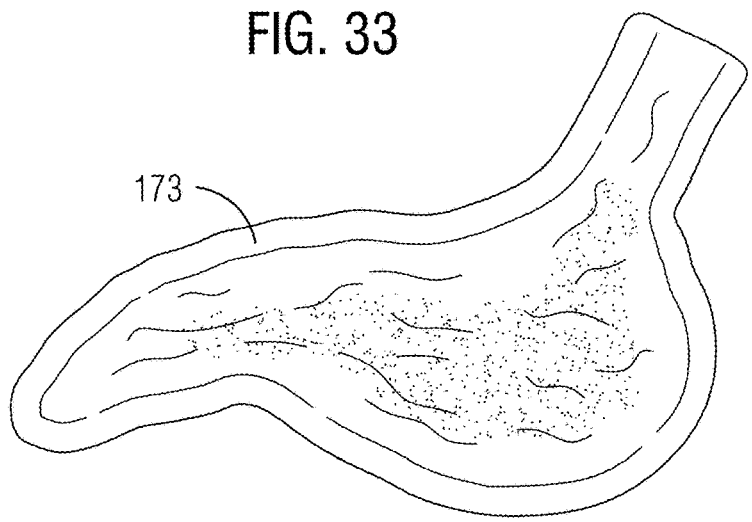
FIG. 33 shows a plan view of a stomach component used with the gastropexy model system shown in FIG. 29.
Figure 34:
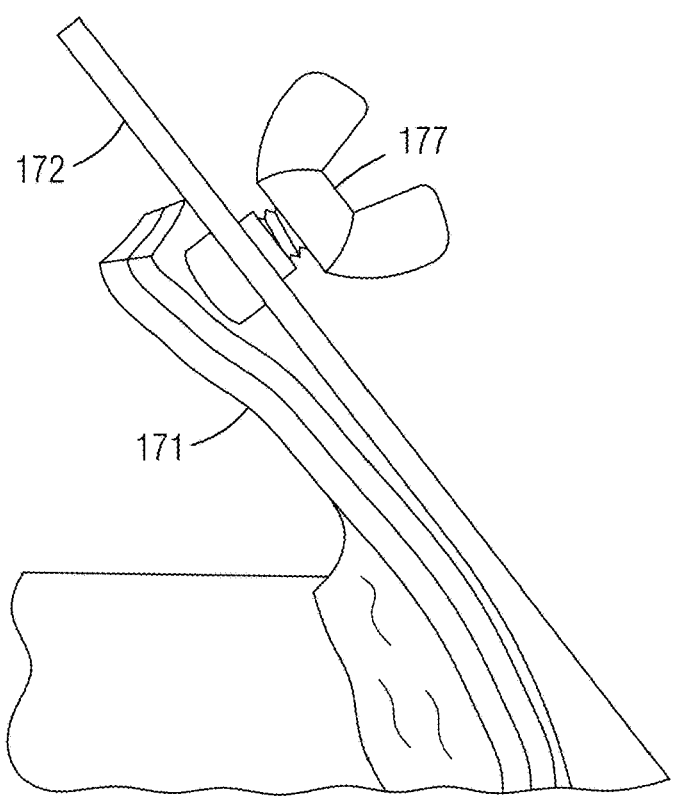
FIG. 34 shows a side view of a portion of the gastropexy model system shown in FIG. 29.
Figure 35:
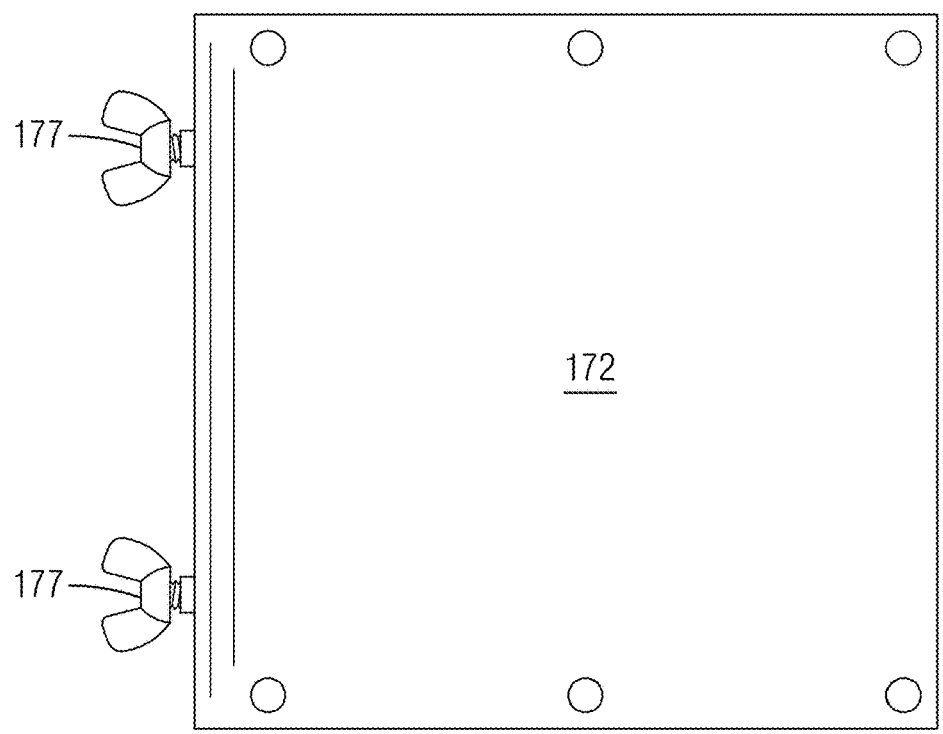
FIG. 35 shows a bottom view of the gastropexy model system shown in FIG. 29.
Figure 36:
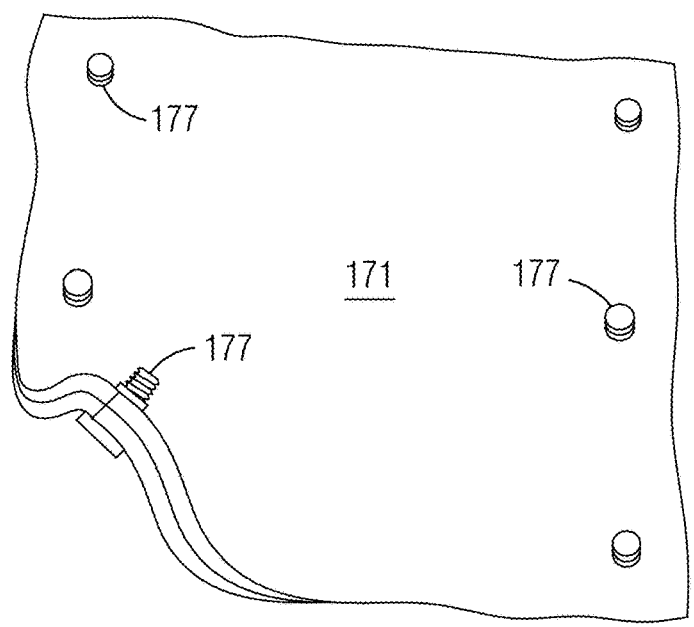
FIG. 36 shows a disassembled view of the model system shown in FIG. 29.
Figure 37:
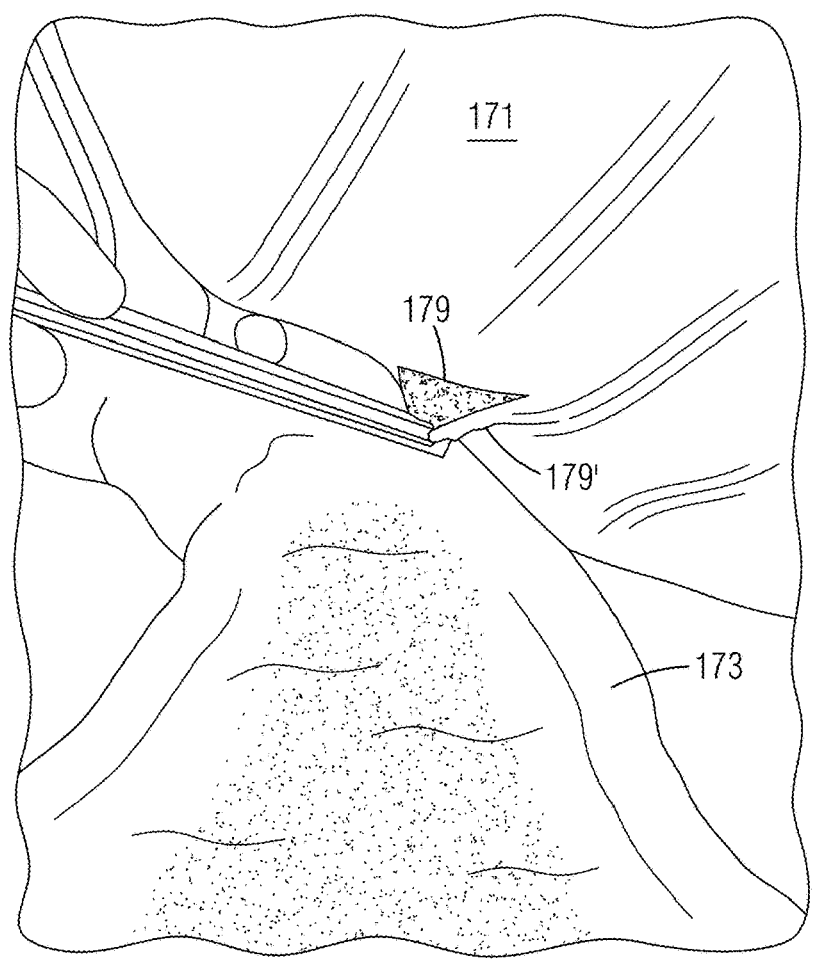
FIG. 37 shows a perspective view of using the gastropexy model system shown in FIG. 29 to conduct a gastropexy procedure.
Figure 38:
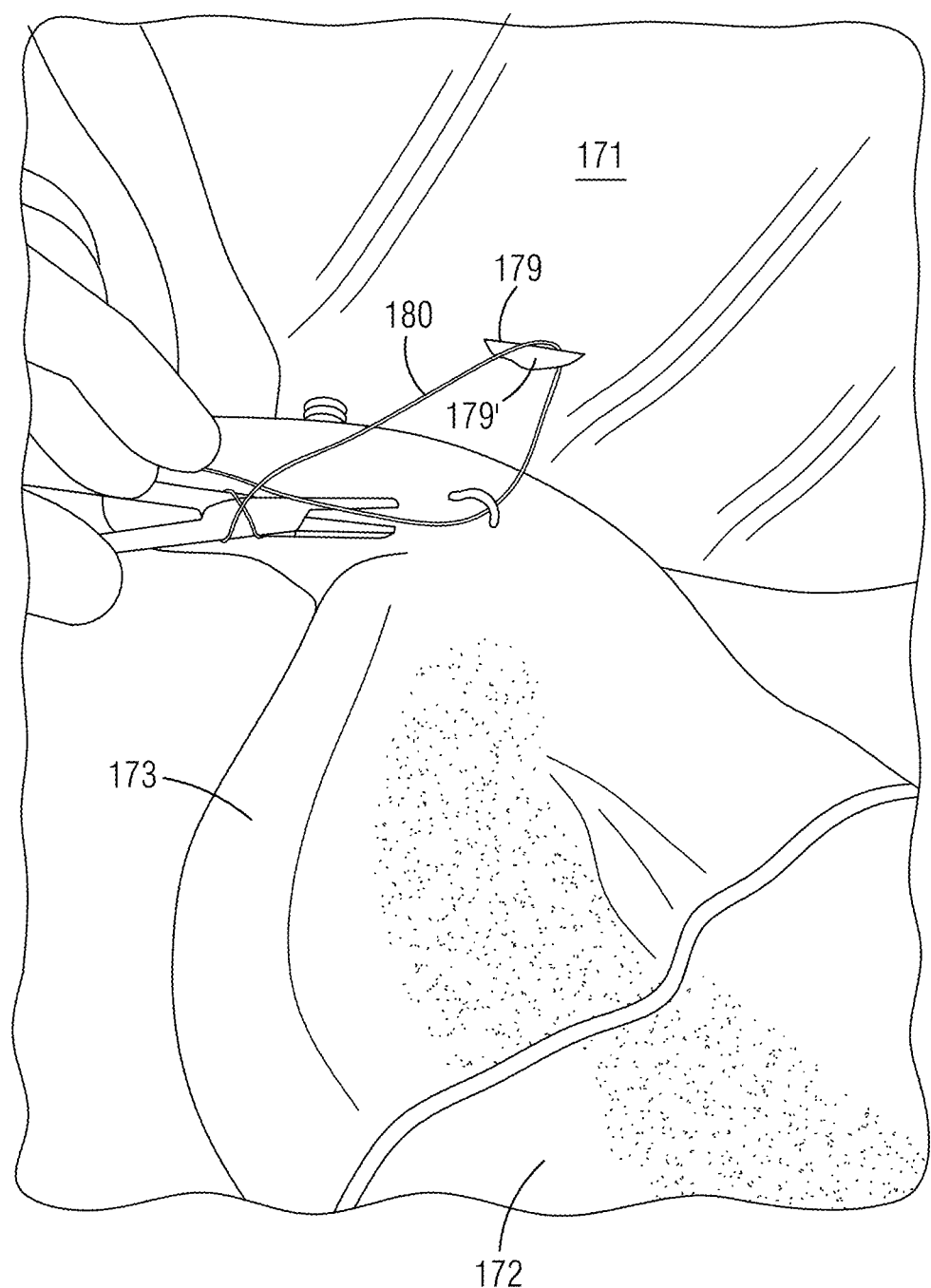
FIG. 38 shows a perspective view of using the gastropexy model system shown in FIG. 29 to conduct a gastropexy procedure.
Figure 39:
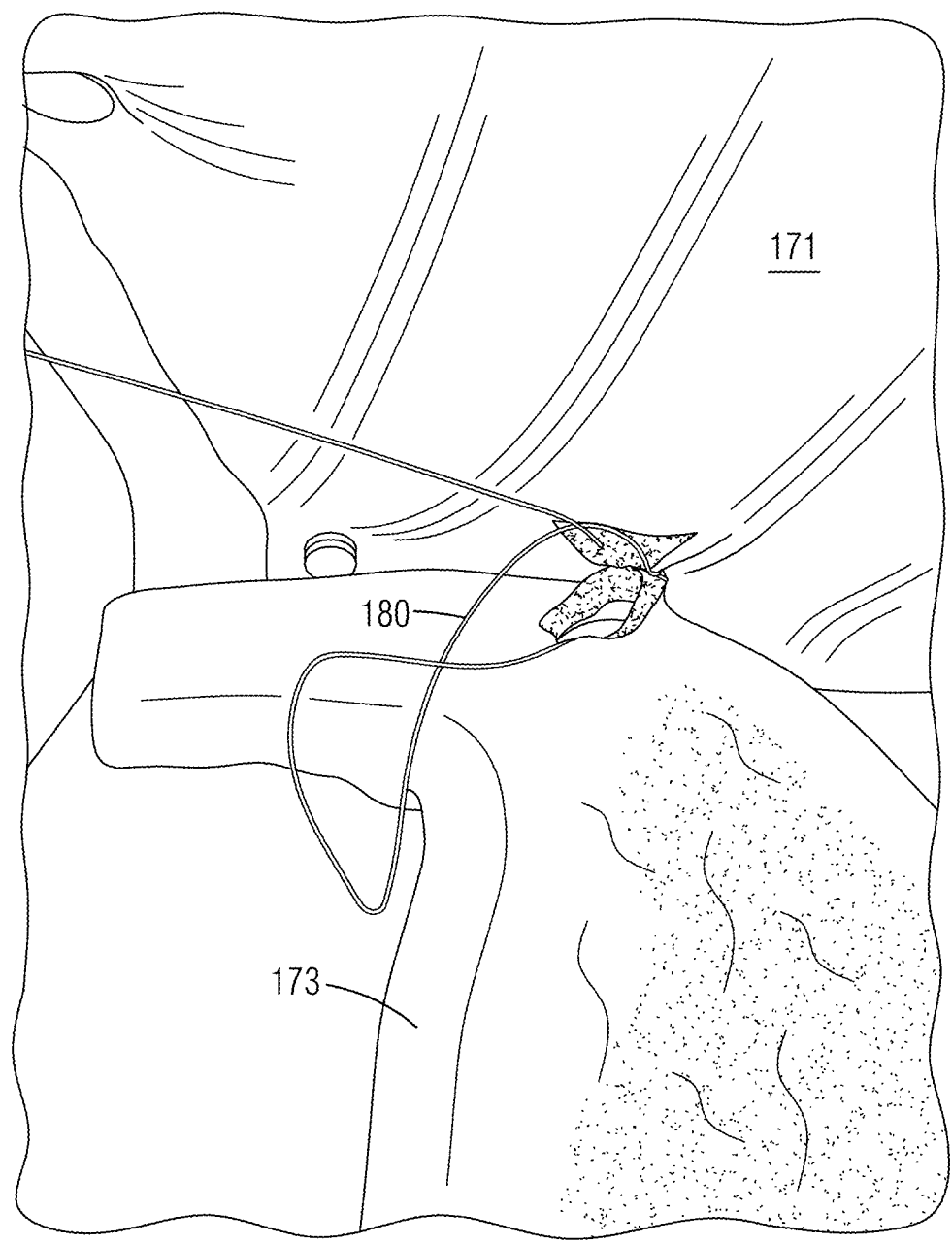
FIG. 39 shows a perspective view of using the gastropexy model system shown in FIG. 29 to conduct a gastropexy procedure.
Figure 40:
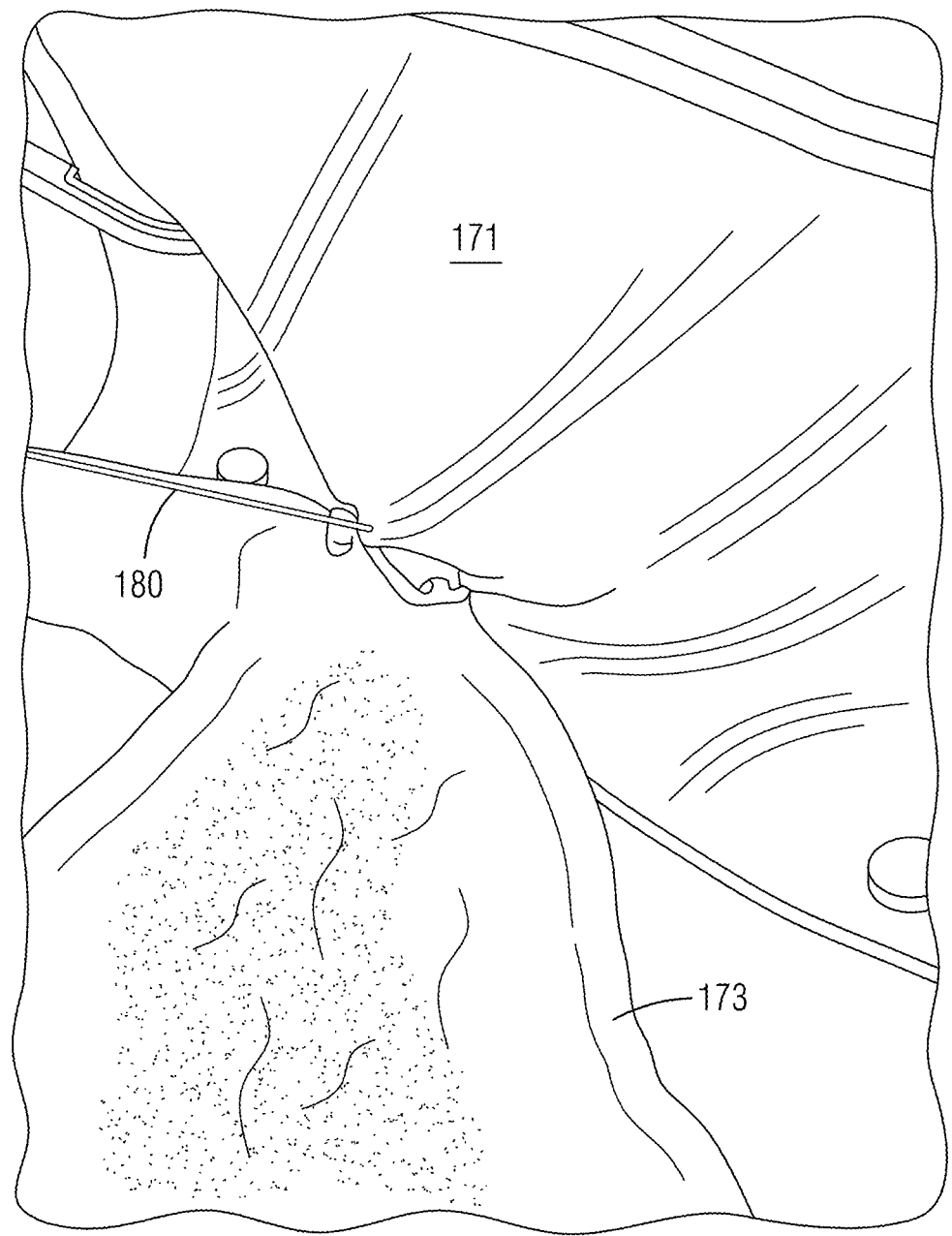
FIG. 40 shows a perspective view of using the gastropexy model system shown in FIG. 29 to conduct a gastropexy procedure.
Figure 41:
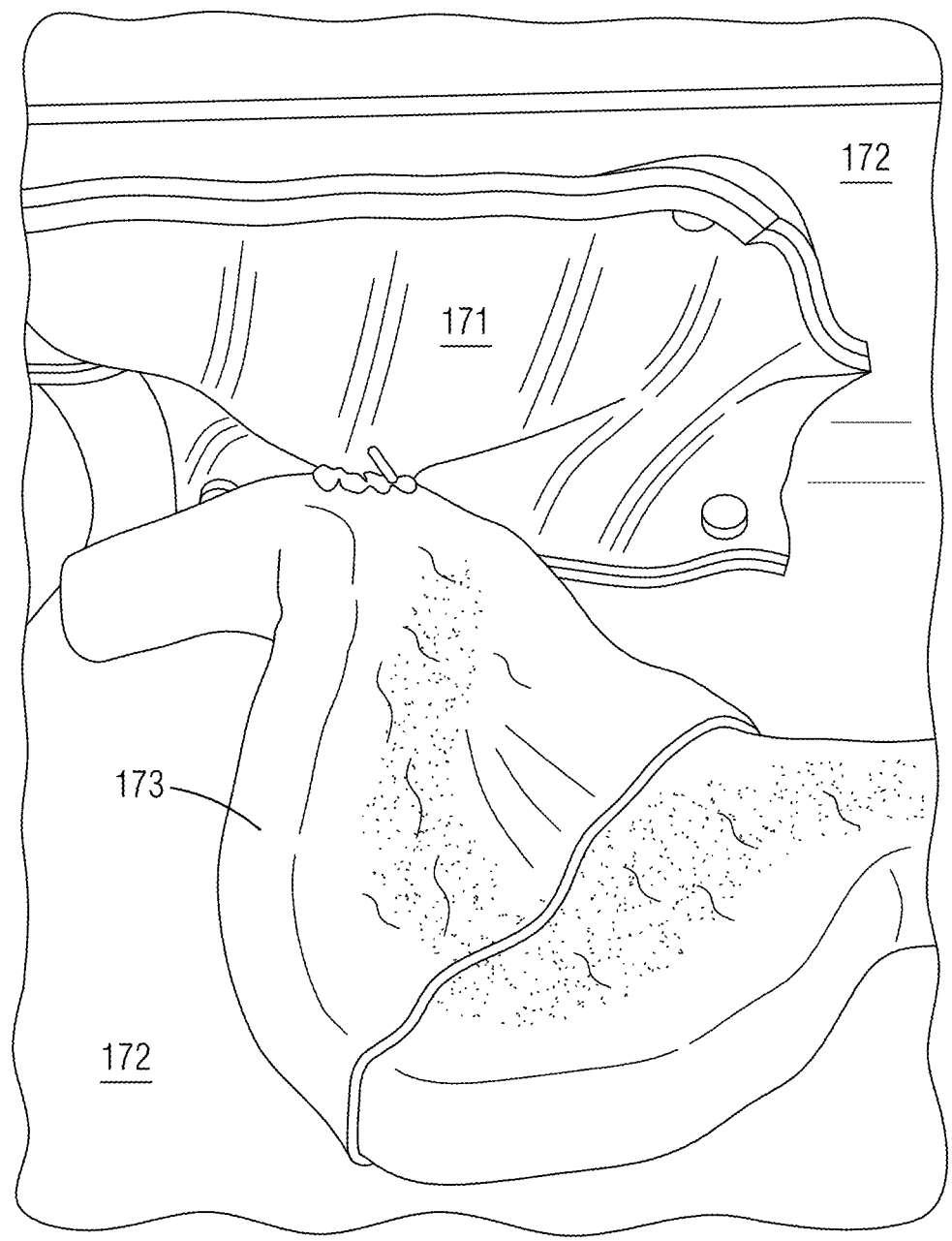
FIG. 41 shows a perspective view of using the gastropexy model system shown in FIG. 29 to conduct a gastropexy procedure.

FIGS. 29-41 shows a stand-alone gastropexy trainer model 170. FIG. 29 shows a front view of the model that includes an abdominal wall patch 171 secured to a wall structure 172 intended to represent the abdominal wall. Also shown is a stomach component 173 that has a replaceable stomach tissue sleeve 174. FIGS. 30-41 show assembly of the model 170 and implementation to train for a gastropexy procedure. FIG. 30 shows the unattached abdominal wall patch 171. FIG. 31 shows the unassociated replaceable stomach tissue sleeve 174. FIG. 32 shows the replaceable stomach tissue sleeve 174 associated with the stomach component 173. FIG. 33 shows the stomach component 173 disassociated from the sleeve 174. FIG. 34 shows a side view of the wall 172 and abdominal wall patch 171 attached with a fastener 177. FIG. 35 shows a bottom view of the wall structure 172. FIG. 36 shows the fasteners that are passed through the abdominal wall patch 171 in preparation for attachment to the wall structure 172. FIG. 37 shows a small incision 179 made in the abdominal wall patch 171 to form a tissue flap 179' in preparation for attachment to the replaceable sleeve 173. FIG. 38 shows the attachment of the replaceable sleeve 173 to the abdominal wall patch 171 at the incision 179 via a suture 180. FIG. 39 shows the further suturing of the replaceable sleeve 173 to the abdominal wall patch 171. FIG. 40 shows the how the replaceable sleeve 173 can be juxtaposed to the abdominal wall patch 171. FIG. 41 shows the completed attachment of the replaceable sleeve 173 to the abdominal wall patch 171. The various soft tissue components shown in FIGS. 32-44 are made of synthetic tissue to simulate properties of the various enumerated components.

Figure 42:
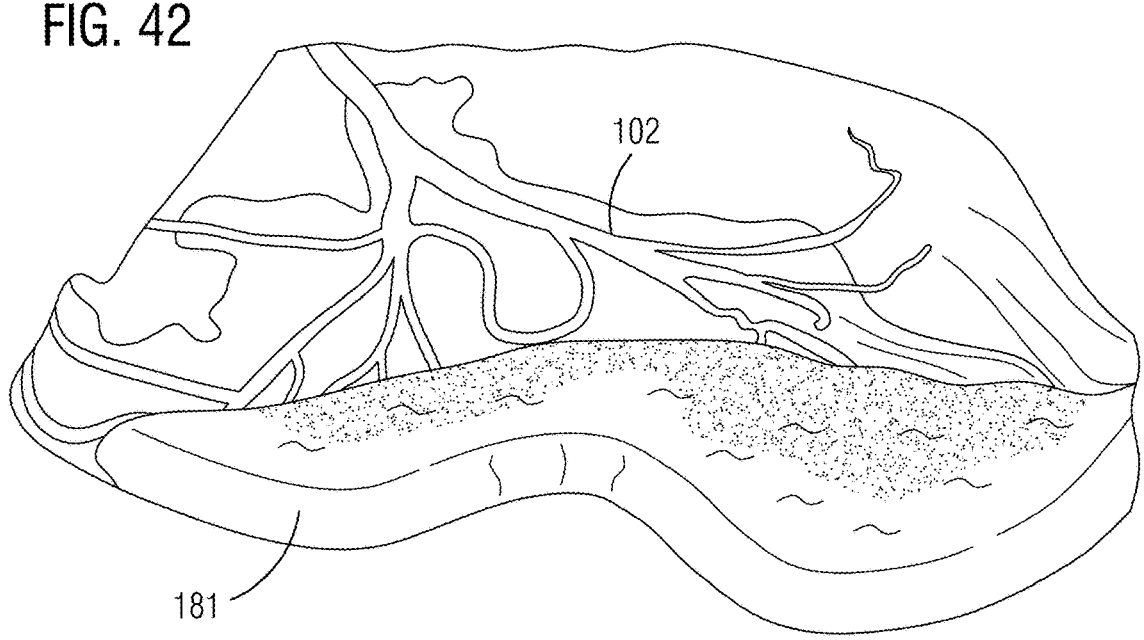
FIG. 42 shows a canine diseased spleen model.

FIG. 42 shows a canine diseased spleen model 180. As shown, the spleen component is associated with omentum 102. The spleen model 180 is enlarged and discolored to enable proper diagnosis of spleen related disorders. Features of the diseased spleen include —gross enlargement of spleen suggesting neoplastic infiltrate; —multiple nodules and hemorrhaging masses on spleen surface representing splenic neoplasia; —active vasculature to the spleen that will bleed a blood analog allowing ligation and splenectomy; and/or —masses actively bleeding blood analog creating a hemoabodemn. The spleen model 180 can be configured to include any of the above anatomical features.

Figure 43:
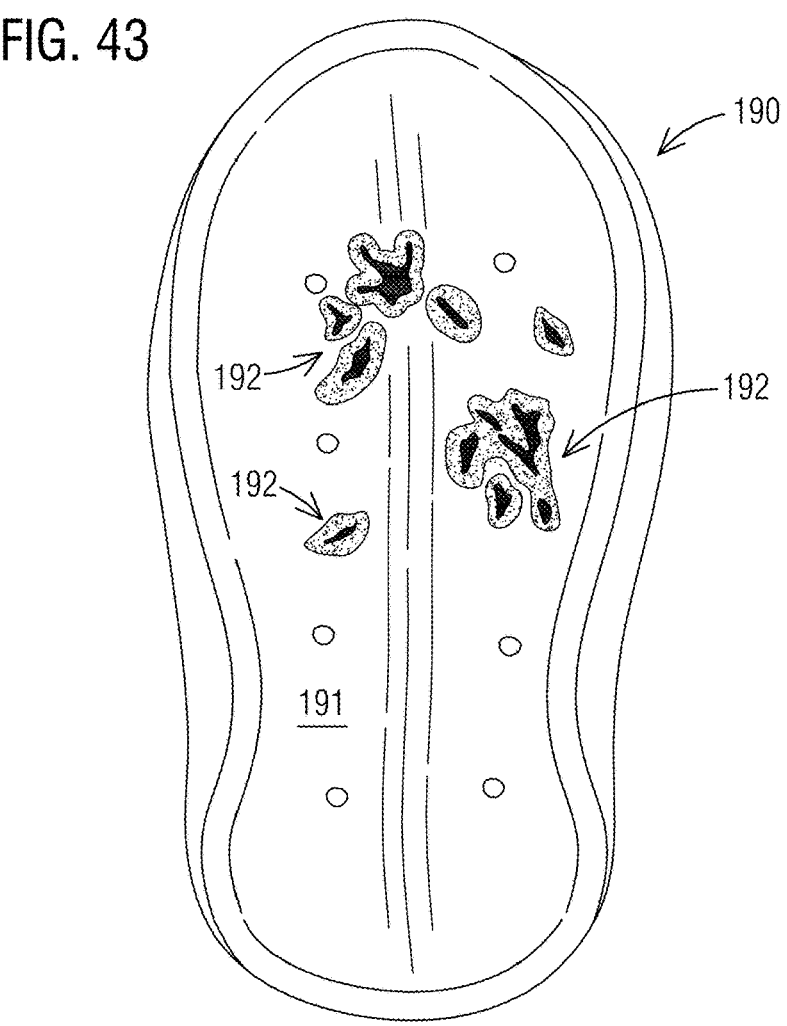
FIG. 43 shows a view of a canine trauma model abdomen portion.
Figure 44:
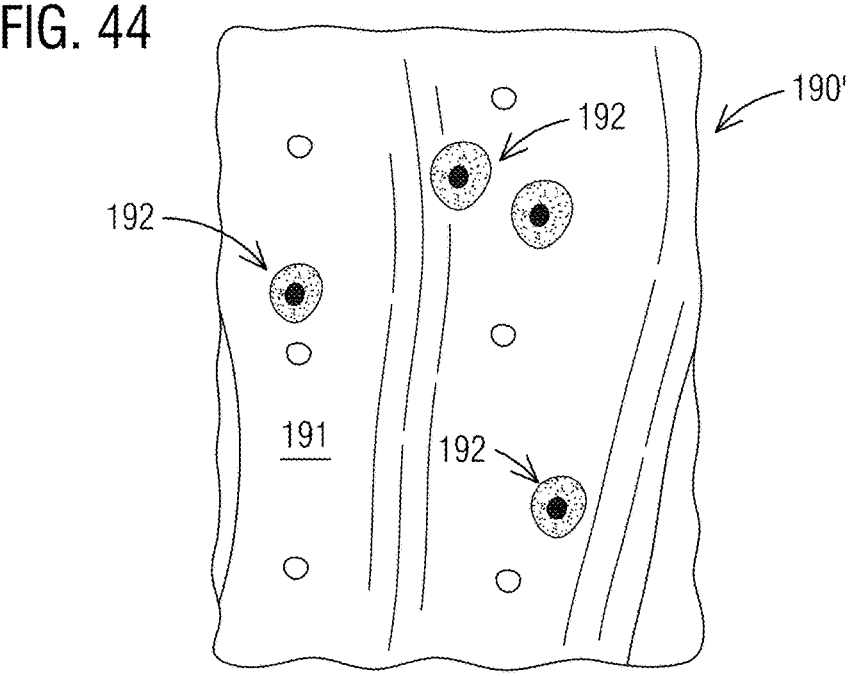
FIG. 44 shows a view of a canine trauma model abdomen portion.
Figure 45:
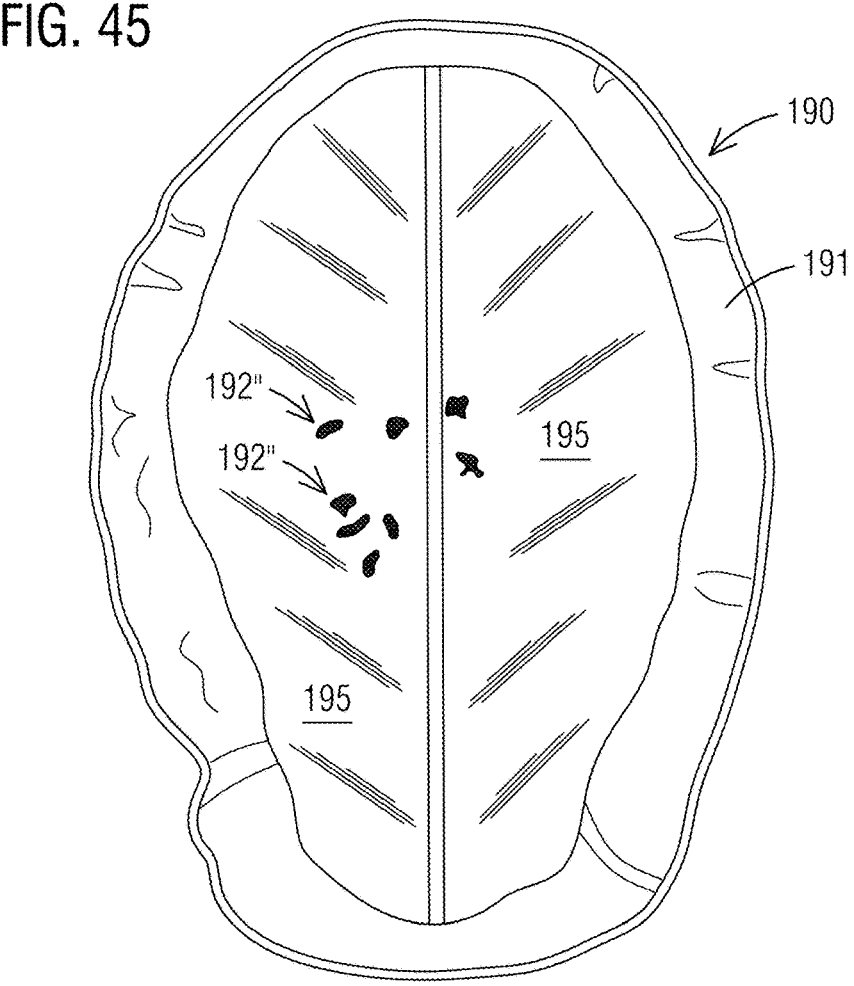
FIG. 45 shows a view of an inner wall of the canine trauma model abdomen portion shown in FIG. 43.
Figure 46:
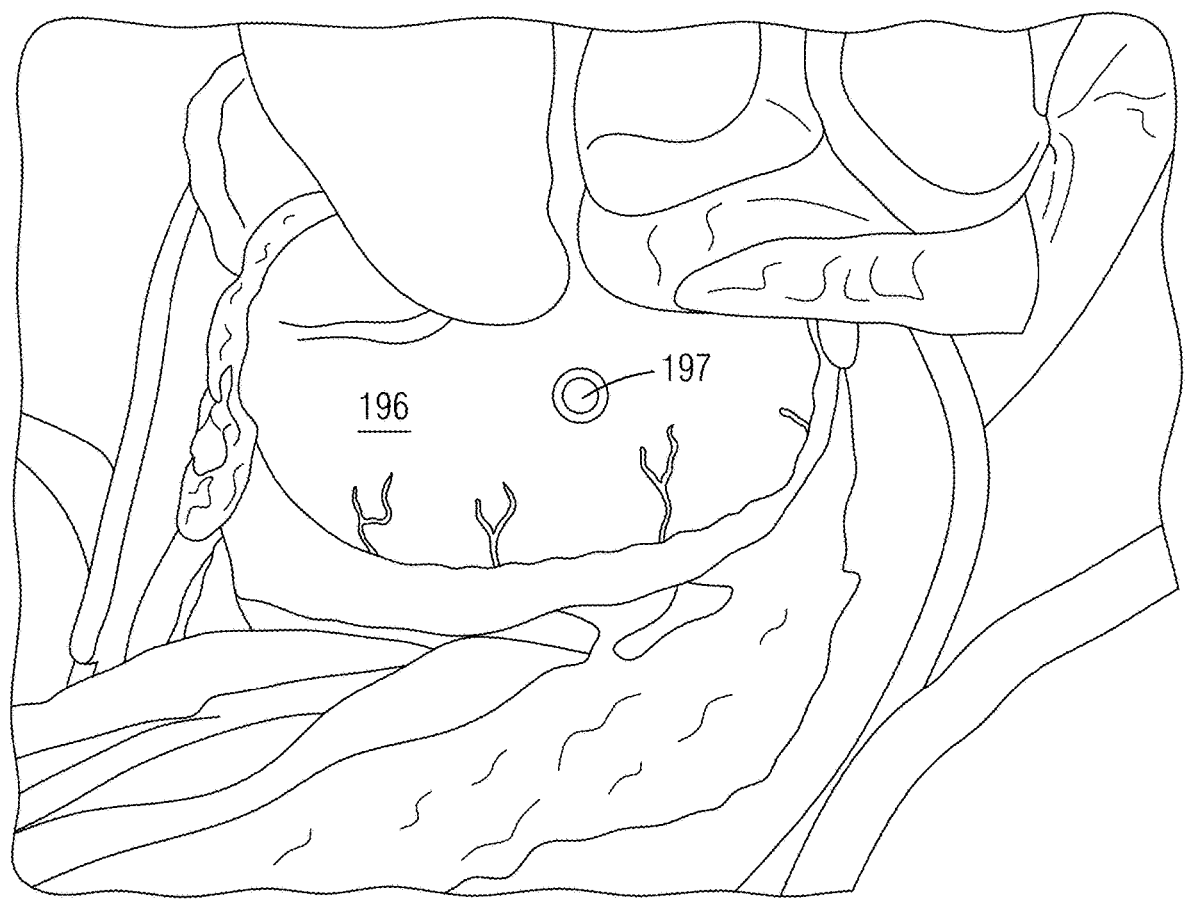
FIG. 46 shows a canine trauma model system with bullet lodged in stomach component.
Figure 47:
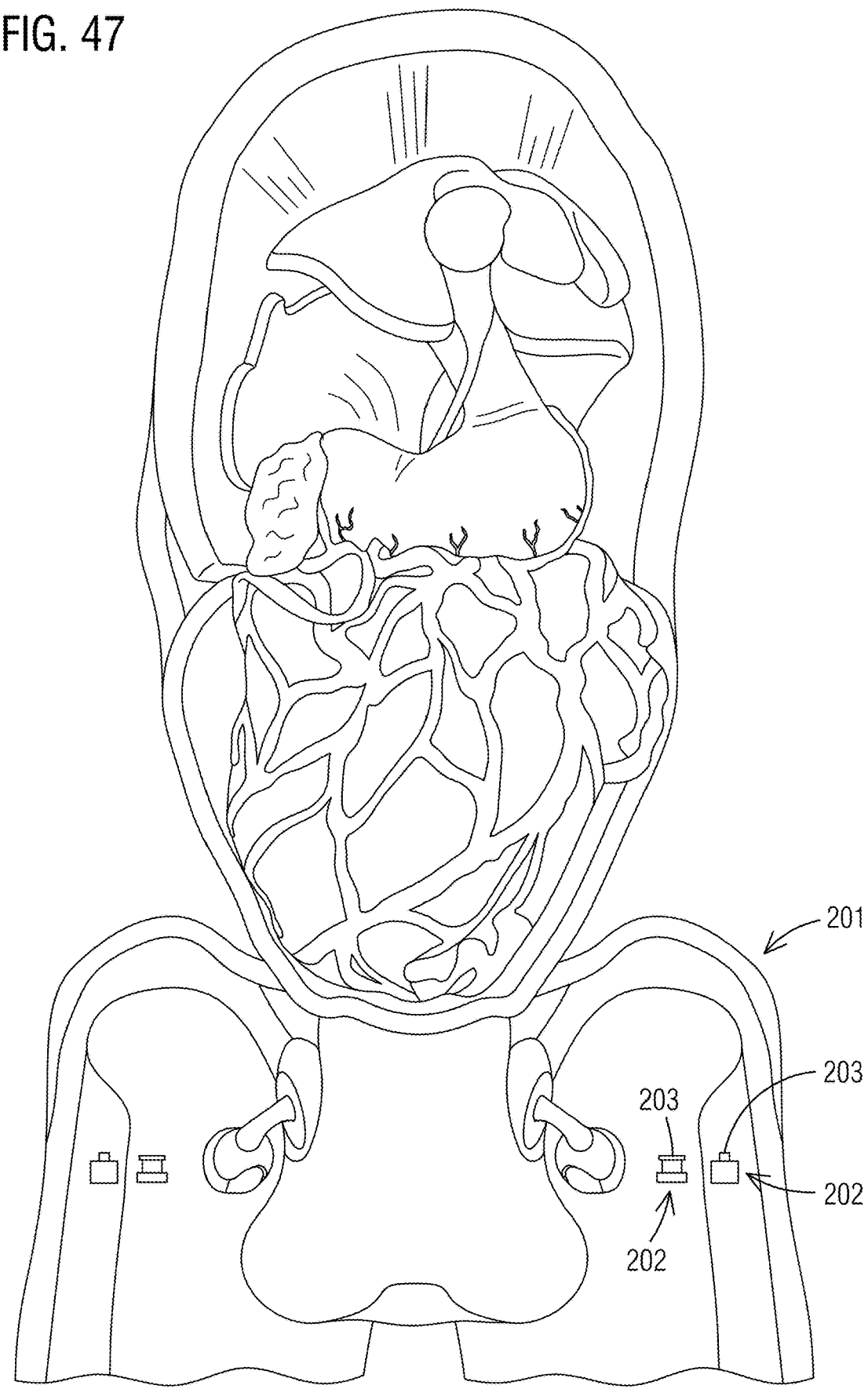
FIG. 47 shows a ventral view of a canine model system with open abdomen.

FIG. 43-46 shows a canine trauma model 190. The canine trauma model 190 is comprised of an abdominal cover with skin 191 and various trauma holes 192. The trauma holes of FIG. 43 are designed to resemble wounds from shrapnel, such as commonly occurs for military dogs. FIG. 44 shows a canine trauma model 190' with skin component 191 and trauma holes 192' resembling bullet wounds. FIG. 45 shows an interior wall of trauma model 190 which includes a muscle component 195 associated with skin component 191. The muscle component 195 includes trauma holes 192" resembling injury to the muscle component 195 caused by shrapnel. FIG. 46 shows the internal cavity of a model such as that shown in FIG. 47 wherein a stomach component 196 includes a bullet 197 embedded therein. The inclusion of a bullet 197 or other metal pieces allows for practice of exploratory surgery to identify the presence of and removal of any metal components. Turning to FIG. 47, shown is a model that includes a leg component 201 into which is embedded a luminal structure 202 simulating a vein or artery. The luminal structure 202 includes a port 203 for connecting the luminal structure 202 to a fluid source. Based on the teachings herein, one skilled in the art will appreciate that metal components can be embedded in various internal organs to practice removal and reparative surgeries. The various soft tissue components shown in FIGS. 43-47 are made of synthetic tissue to simulate properties of the various enumerated components. Also, in any of the canine models 190 or 190' the tissues may include simulated blood that is released when the tissues are disrupted. This can be simulated blood that is infused into the tissues, or there can be reservoirs or simulated vasculature that contain the simulated blood.

What is claimed is:

1. An artificial anatomic canine model configured to geometrically mimic a canine torso, wherein said torso comprises:
    a thoracic cavity defined by the canine torso;
    a diaphragm associated with the thoracic cavity, wherein the diaphragm comprises a hinge on a dorsal aspect that allows the diaphragm to be pivotably opened for access to the thoracic cavity; and
    at least one module that geometrically mimics at least a portion of a canine organ positioned in the cavity, wherein the at least one module is comprised of, in part, or in whole, a hydrogel.

2. The anatomic model of claim 1, wherein the model further comprises a canine head associated with the canine torso.

3. The anatomic model of claim 2, wherein the at least one module comprises a canine lung and a trachea in communication with the lung and the canine head.

4. The anatomic model of claim 3, wherein the canine torso comprises a plurality of rib bones to geometrically mimic a canine thoracic cavity and artificial rib muscle tissue layered over the rib bones.

5. The anatomic model of claim 4, wherein the model further comprises a skin patch superimposed over the artificial rib muscle tissue.

6. The anatomical model of claim 5, wherein the skin patch is secured by one or more fasteners.

7. The anatomical model of claim 2, further comprising a canine neck associated with the canine head.

8. The anatomical model of claim 7, wherein the neck further comprises artificial neck muscle tissue.

9. The anatomic model of claim 1, wherein the at least one module comprises a canine spleen.

10. The anatomic model of claim 9, wherein the canine spleen comprises pathological features, wherein the pathological features comprise one or more of
- gross enlargement of spleen suggesting neoplastic infiltrate;
- multiple nodules and hemorrhaging masses on spleen surface representing splenic neoplasia;
- active vasculature to the spleen that will bleed a blood analog allowing ligation and splenectomy; and/or
- masses actively bleeding blood analog creating a hemoabodemn.

11. The model of claim 1, wherein the model further comprises an abdominal cavity, and wherein the diaphragm separates the thoracic and abdominal cavities.

12. The model of claim 1, wherein the diaphragm comprises an opening that allows passage of esophagus and vasculature from thorax to abdomen.

13. The model of claim 1, wherein the diaphragm expands and contracts with lung expansion.

14. The model of claim 1, wherein the diaphragm comprises an inner wall and outer wall, and a hernia section attached to the diaphragm such that it abuts the inner wall, wherein the hernia section comprises a slit to geometrically mimic a diaphragmatic hernia.

15. The model of claim 14, wherein the diaphragm includes a reinforcement structure on the outer wall thereof such that an attachment component can be passed through the hernia section and into the diaphragm and through the reinforcement structure to secure the hernia section to the diaphragm.

16. The model of claim 14, wherein the hernia section is removably attached to the diaphragm.

* * * * *